US010955947B2

(12) United States Patent
Bennett et al.

(10) Patent No.: US 10,955,947 B2
(45) Date of Patent: Mar. 23, 2021

(54) RC TUNING OF TOUCH ELECTRODE CONNECTIONS ON A TOUCH SENSOR PANEL

(71) Applicant: Apple Inc., Cupertino, CA (US)

(72) Inventors: Patrick Bennett, Alameda, CA (US); Byung Duk Yang, Cupertino, CA (US); Chun-Yao Huang, San Jose, CA (US); Hao-Lin Chiu, Campbell, CA (US); Ivan Knez, San Jose, CA (US); Peien Chang, Campbell, CA (US); Rungrot Kitsomboonloha, San Jose, CA (US); Shih-Chang Chang, Cupertino, CA (US); Shinya Ono, Cupertino, CA (US); Szuhsien Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 264 days.

(21) Appl. No.: 15/493,791

(22) Filed: Apr. 21, 2017

(65) Prior Publication Data

US 2018/0032171 A1 Feb. 1, 2018

Related U.S. Application Data

(60) Provisional application No. 62/368,855, filed on Jul. 29, 2016.

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/04164* (2019.05); *G06F 3/04166* (2019.05)

(58) Field of Classification Search
CPC ....... G06F 3/044; G06F 3/0416; G06F 3/0412
See application file for complete search history.

(56) References Cited

U.S. PATENT DOCUMENTS 5,483,261 A   1/1996   Yasutake
5,488,204 A   1/1996   Mead et al.
(Continued)

FOREIGN PATENT DOCUMENTS

JP   2000-163031 A   6/2000
JP   2002-342033 A   11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Grant Sitta
(74) *Attorney, Agent, or Firm* — Kubota & Basol LLP

(57) ABSTRACT

A touch sensor panel comprising a first touch node electrode of a plurality of touch node electrodes, the first touch node electrode coupled to a first sense connection comprising a first set of traces, the first sense connection configured to have a first resistance per unit length that varies along a length of the first sense connection, and a second touch node electrode of the plurality of touch node electrodes, the second touch node electrode coupled to a second sense connection comprising a second set of traces, the second sense connection configured to have a second resistance per unit length that varies along a length of the second sense connection differently than the first resistance per unit length varies along the length of the first sense connection. An effective resistance of the first sense connection and the second sense connection are equal.

17 Claims, 11 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,227,977 B2 | 7/2012 | Lhee et al. |
| 8,479,122 B2 | 7/2013 | Hotelling et al. |
| 9,280,251 B2 | 3/2016 | Shih |
| 9,367,188 B2 | 6/2016 | Lee et al. |
| 9,436,331 B2 | 9/2016 | Jo et al. |
| 2006/0197753 A1 | 9/2006 | Hotelling |
| 2011/0062971 A1* | 3/2011 | Badaye ............... G06F 3/044 324/686 |
| 2011/0210934 A1* | 9/2011 | Lee ..................... G06F 3/044 345/173 |
| 2012/0218199 A1* | 8/2012 | Kim .................... G06F 3/0412 345/173 |
| 2014/0118277 A1* | 5/2014 | Kim .................... G06F 3/044 345/173 |
| 2015/0029144 A1* | 1/2015 | Jo ...................... G06F 3/044 345/174 |
| 2015/0370380 A1 | 12/2015 | Hong et al. |
| 2016/0041665 A1* | 2/2016 | Gwon .................. G06F 3/044 345/174 |
| 2016/0041666 A1 | 2/2016 | Lee et al. |
| 2016/0202833 A1* | 7/2016 | Kim .................... G06F 3/0416 345/173 |
| 2016/0209965 A1 | 7/2016 | Kim et al. |
| 2016/0313860 A1* | 10/2016 | Ono .................... G06F 3/044 |
| 2017/0010715 A1* | 1/2017 | Lee .................... G06F 3/044 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

RC TUNING OF TOUCH ELECTRODE CONNECTIONS ON A TOUCH SENSOR PANEL

CROSS-REFERENCE TO RELATED APPLICATION

This application claims the benefit of U.S. Provisional Application No. 62/368,855, filed Jul. 29, 2016, the entire disclosure of which is herein incorporated by reference in its entirety for all purposes.

FIELD OF THE DISCLOSURE

This relates generally to touch sensor panels, and more particularly to tuning loads presented by connections to touch electrodes on a touch sensor panel.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

SUMMARY OF THE DISCLOSURE

Touch events can be sensed on the above touch sensor panels by detecting changes in the self-capacitance and/or mutual capacitance of the above conductive plates. In order to detect such changes, in some examples, the conductive plates can be coupled to sense circuitry using sense connections. It can be beneficial for the resistances and/or capacitances of these sense connections to be tuned such that transient operation of the sense connections (e.g., their bandwidths) can achieve desired parameters. The examples of the disclosure provide various techniques for tuning the resistances and/or capacitances of these sense connections.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples. Further, in the context of this disclosure, description of two quantities being "substantially equal" or "substantially the same" (or the like) is understood to include instances in which the quantities are equal and/or instances in which the quantities are within 15% of one another.

Some capacitive touch sensor panels can be formed by a matrix of substantially transparent or non-transparent conductive plates made of materials such as Indium Tin Oxide (ITO), and some touch screens can be formed by at least partially integrating touch sensing circuitry into a display pixel stackup (i.e., the stacked material layers forming the display pixels). Touch events can be sensed on the above touch sensor panels by detecting changes in the self-capacitance and/or mutual capacitance of the above conductive plates. In order to detect such changes, in some examples, the conductive plates can be coupled to sense circuitry using sense connections. It can be beneficial for the resistances and/or capacitances of these sense connections to be tuned such that transient operation of the sense connections (e.g., their bandwidths) can achieve desired parameters. The examples of the disclosure provide various techniques for tuning the resistances and/or capacitances of these sense connections.

Figure 1A:
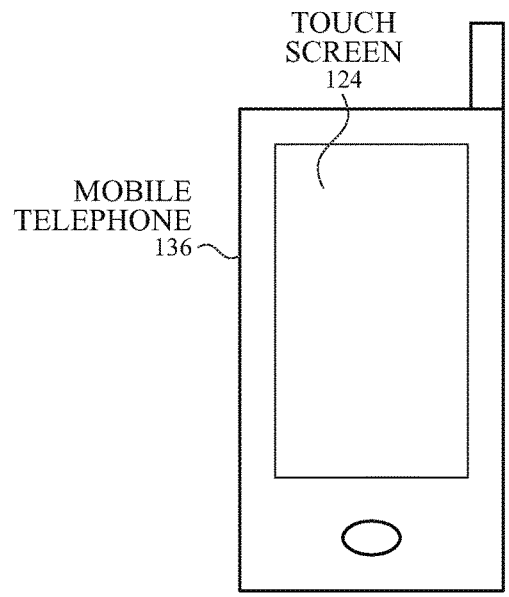
FIGS. 1A-1D illustrate an example mobile telephone, an example media player, an example personal computer and an example tablet computer that can each include an exemplary touch screen according to examples of the disclosure.
Figure 1B:
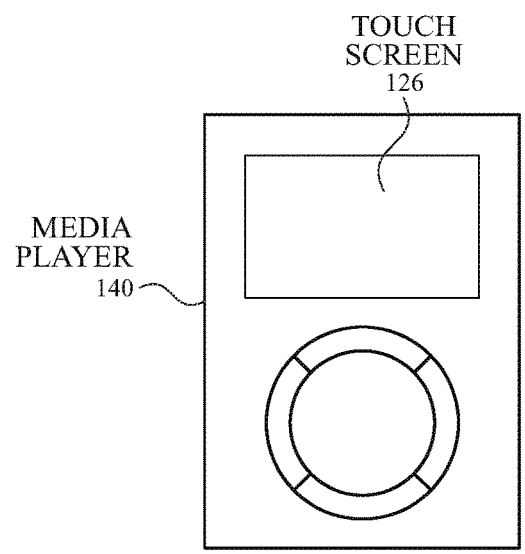
Figure 1C:
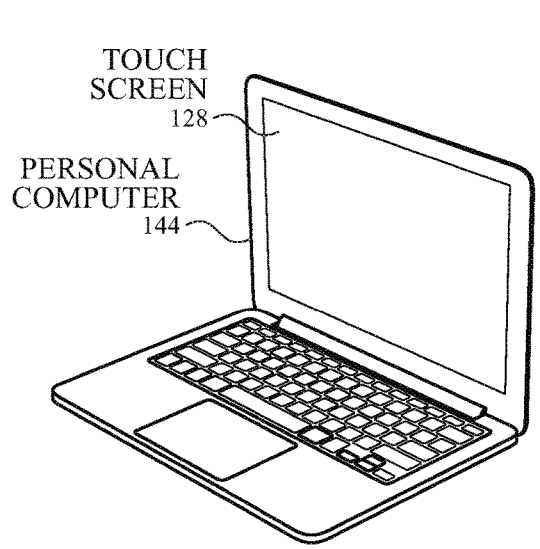
Figure 1D:
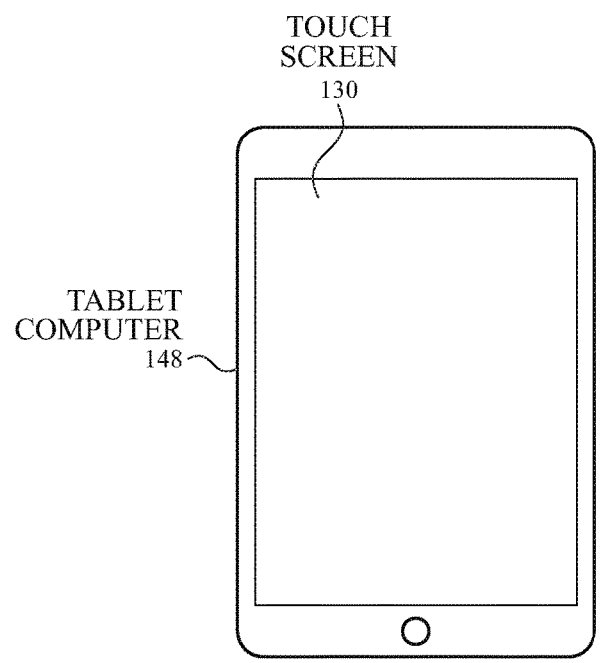

FIGS. 1A-1D illustrate example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. FIG. 1D illustrates an example tablet computer 148 that includes a touch screen 130. It is understood that the above touch screens can be implemented in other devices as well, including in wearable devices.

In some examples, touch screens 124, 126, 128 and 130 can be based on self-capacitance. A self-capacitance based touch system can include a matrix of small, individual plates of conductive material that can be referred to as touch node electrodes (as described below with reference to touch screen 220 in FIG. 2). For example, a touch screen can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an AC waveform, and the self-capacitance to ground of the touch node electrode can be measured. As an object approaches the touch node electrode, the self-capacitance to ground of the touch node electrode can change. This change in the self-capacitance of the touch node electrode can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128 and 130 can be based on mutual capacitance. A mutual capacitance based touch system can include drive and sense lines that may cross over each other on different layers, or may be adjacent to each other on the same layer. The crossing or adjacent locations can be referred to as touch nodes. During operation, the drive line can be stimulated with an AC waveform and the mutual capacitance of the touch node can be measured. As an object approaches the touch node, the mutual capacitance of the touch node can change. This change in the mutual capacitance of the touch node can be detected and measured by the touch sensing system to determine the positions of multiple objects when they touch, or come in proximity to, the touch screen.

Figure 2:
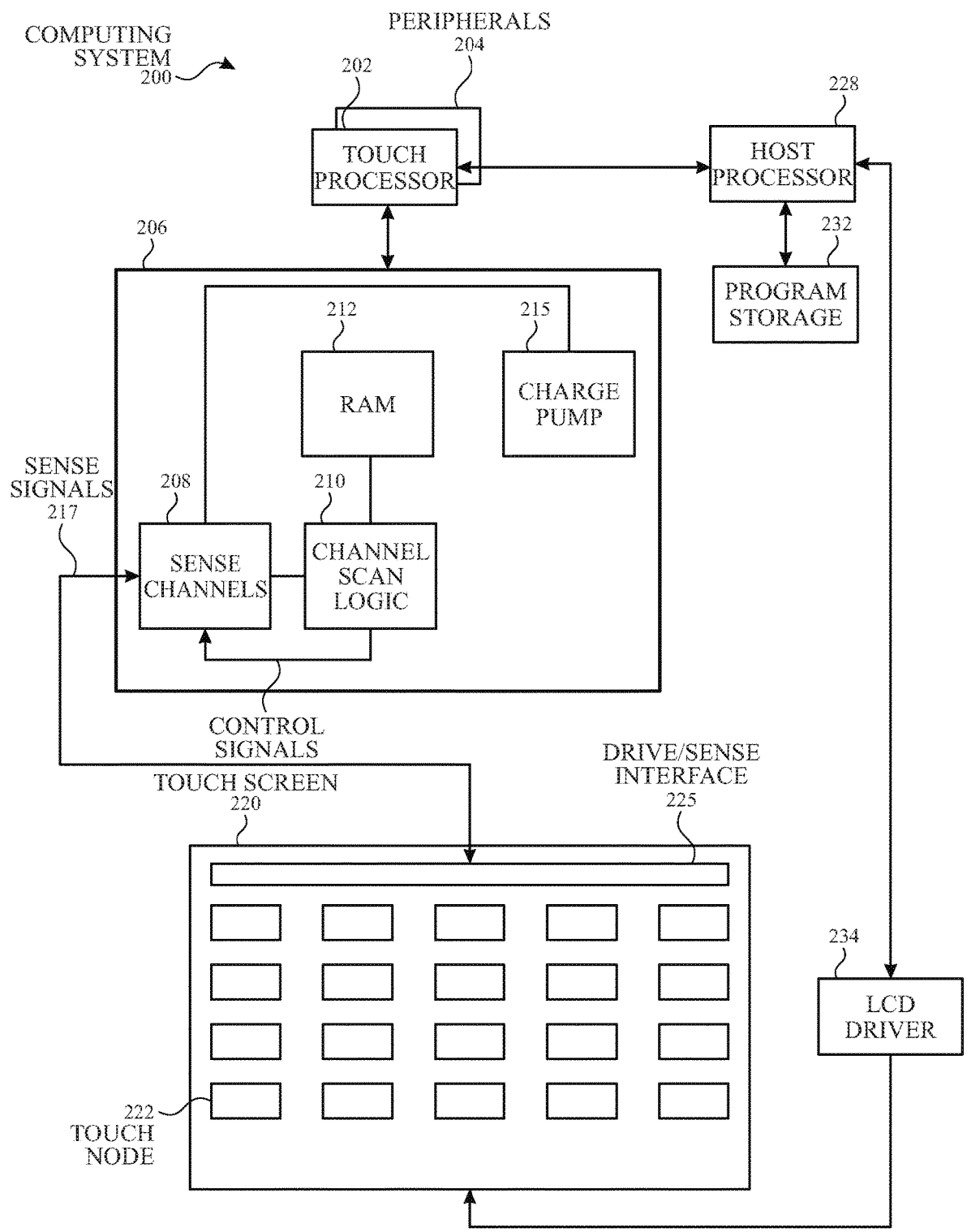
FIG. 2 is a block diagram of an example computing system that illustrates one implementation of an example self-capacitance touch screen according to examples of the disclosure.

FIG. 2 is a block diagram of an example computing system 200 that illustrates one implementation of an example self-capacitance touch screen 220 according to examples of the disclosure. It is understood that computing system 200 can instead include a mutual capacitance touch screen, as described above, though the examples of the disclosure will be described assuming a self-capacitance touch screen is provided. Computing system 200 can be included in, for example, mobile telephone 136, digital media player 140, personal computer 144, tablet computer 148, or any mobile or non-mobile computing device that includes a touch screen, including a wearable device. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208 and channel scan logic 210. Channel scan logic 210 can access RAM 212, autonomously read data from sense channels 208 and provide control for the sense channels. In addition, channel scan logic 210 can control sense channels 208 to generate stimulation signals at various frequencies and phases that can be selectively applied to the touch nodes of touch screen 220, as described in more detail below. In some examples, touch controller 206, touch processor 202 and peripherals 204 can be integrated into a single application specific integrated circuit (ASIC), and in some examples can be integrated with touch screen 220 itself.

Touch screen 220 can include touch sensing circuitry that can include a capacitive sensing medium having a plurality of electrically isolated touch node electrodes 222 (e.g., a pixelated self-capacitance touch screen). Touch node electrodes 222 can be coupled to sense channels 208 in touch controller 206, can be driven by stimulation signals from the sense channels through drive/sense interface 225, and can be sensed by the sense channels through the drive/sense interface as well, as described above. Labeling the conductive plates used to detect touch (i.e., touch node electrodes 222) as "touch node" electrodes can be particularly useful when touch screen 220 is viewed as capturing an "image" of touch (e.g., a "touch image"). In other words, after touch controller 206 has determined an amount of touch detected at each touch node electrode 222 in touch screen 220, the pattern of touch node electrodes in the touch screen at which a touch occurred can be thought of as a touch image (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (e.g., gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
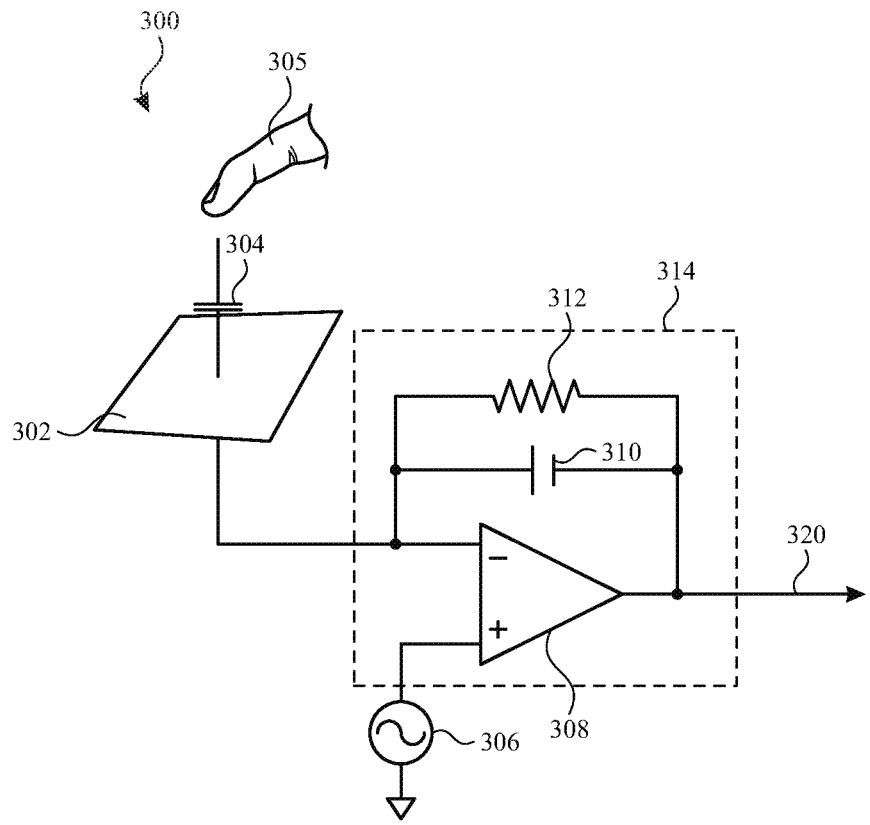
FIG. 3A illustrates an exemplary touch sensor circuit corresponding to a self-capacitance touch node electrode and sensing circuit according to examples of the disclosure.

FIG. 3A illustrates an exemplary touch sensor circuit 300 corresponding to a self-capacitance touch node electrode 302 and sensing circuit 314 according to examples of the disclosure. Touch node electrode 302 can correspond to touch node electrode 222. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 (Vac) can be coupled to the non-inverting input (+) of operational amplifier 308. Touch sensor circuit 300 can be configured to sense changes in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
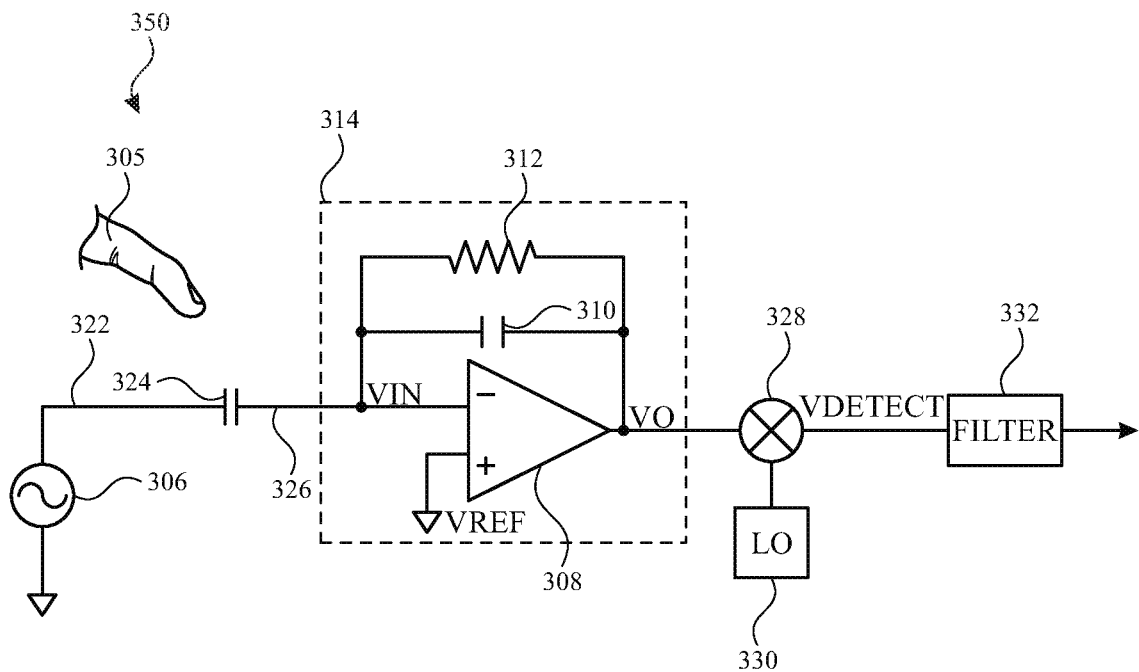
FIG. 3B illustrates an exemplary touch sensor circuit corresponding to a mutual-capacitance drive and sense line and sensing circuit according to examples of the disclosure.

FIG. 3B illustrates an exemplary touch sensor circuit 350 corresponding to a mutual-capacitance drive 322 and sense 326 line and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can be altered. This change in mutual capacitance 324 can be detected to indicate a touch or proximity event at the touch node, as described previously and below. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage Vref. Operational amplifier 308 can drive its output to voltage Vo to keep Vin substantially equal to Vref, and can therefore maintain Vin constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce Vdetect. Vdetect can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of Vdetect can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays, such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4A:
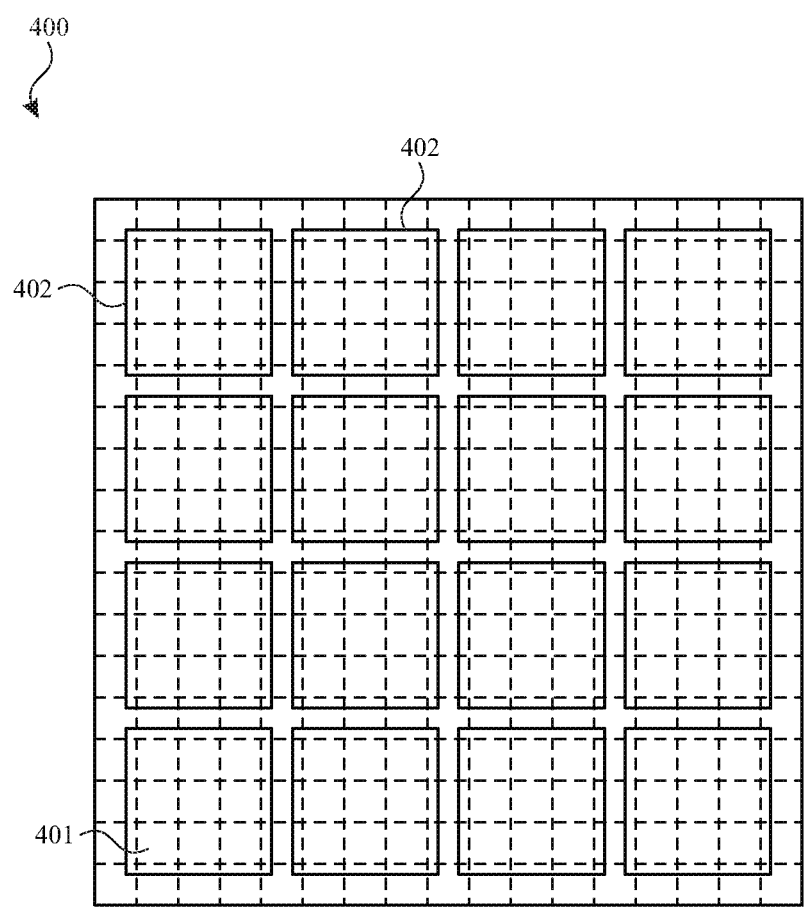
FIG. 4A illustrates an example configuration in which common electrodes can form portions of the touch sensing circuitry of a touch sensing system according to examples of the disclosure.

FIG. 4A illustrates an example configuration in which common electrodes 402 can form portions of the touch sensing circuitry of a touch sensing system—in some examples of this disclosure, the common electrodes can form touch node electrodes used to detect a touch image on touch screen 400, as described above. Each common electrode 402 can include a plurality of display pixels 401, and each display pixel 401 can include a portion of a common electrode 402, which can be a circuit element of the display system circuitry in the display pixel stackup (i.e., the stacked material layers forming the display pixels) of the display pixels of some types of LCDs or other displays—in other words, the common electrodes can operate as part of the display system to display a display image on touch screen 400.

In the example shown in FIG. 4A, each common electrode 402 can serve as a multi-function circuit element that can operate as display circuitry of the display system of touch screen 400 and can also operate as touch sensing circuitry of the touch sensing system. Specifically, each common electrode 402 can operate as a common electrode of the display circuitry of the touch screen 400 (e.g., during a display phase), as described above, and can also operate as a touch node electrode of the touch sensing circuitry of the touch screen (e.g., during a touch sensing phase). Other circuit elements of touch screen 400 can also form part of the touch sensing circuitry. More specifically, in some examples, during the touch sensing phase, a gate line can be connected to a power supply, such as a charge pump, that can apply a voltage to maintain TFTs in display pixels included in a common electrode 402 in an "off" state. Stimulation signals can be applied to the common electrode 402. Changes in the total self-capacitance of the common electrode 402 can be sensed through one or more operational amplifiers, as previously discussed. The changes in the total self-capacitance of the common electrode 402 can depend on the proximity of an object, such as finger 305, to the common electrode. In this way, the measured changes in total self-capacitance of the common electrode 402 can provide an indication of touch on or near the touch screen. A mutual capacitance touch screen can similarly be implemented in which common electrodes can form portions of the touch sensing circuitry of the mutual capacitance touch screen. For example the common electrodes can form drive or sense lines used to detect a touch image on the touch screen, as described above.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlapping, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 402 (i.e., touch node electrodes) and display pixels 401 of FIG. 4A are shown as rectangular or square regions on touch screen 400. However, it is understood that the common electrodes 402 and display pixels 401 are not limited to the shapes, orientations, and positions shown, but can include any suitable configurations according to examples of the disclosure. Further, the examples of the disclosure will be provided in the context of a touch screen, but it is understood that the examples of the disclosure can similarly be implemented in the context of a touch sensor panel.

As described above, the self-capacitance of each touch node electrode (e.g., touch node electrode 222) in the touch screen of the disclosure can be sensed to capture an image of touch across the touch screen. To allow for the sensing of the self-capacitance of individual touch node electrodes, it can be necessary to route one or more electrical connections between each of the touch node electrodes and the touch sensing circuitry (e.g., sense channels 208) of the touch screen.

Figure 4B:
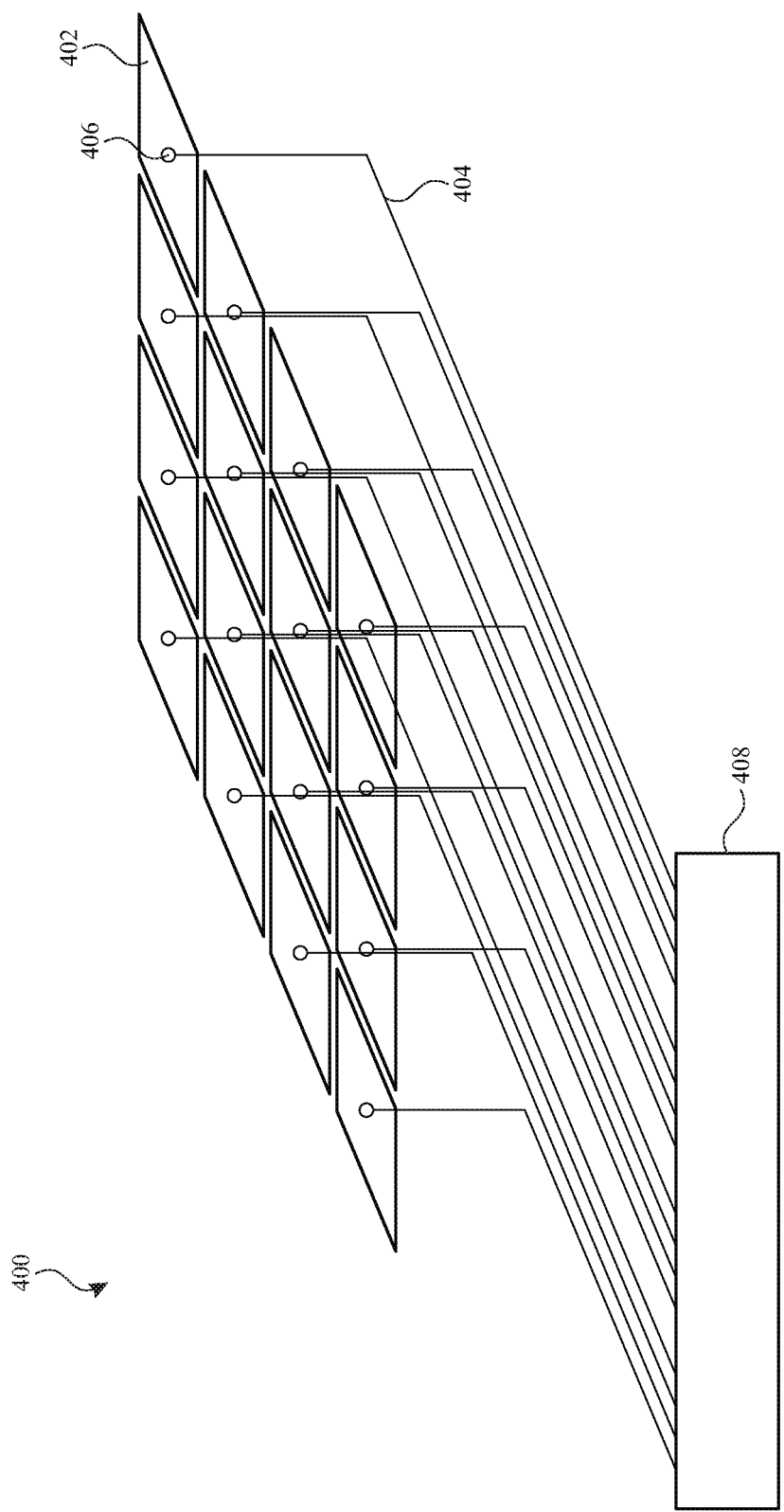
FIG. 4B illustrates an exemplary configuration for electrically connecting touch node electrodes in a touch screen to sense channels according to examples of the disclosure.

FIG. 4B illustrates an exemplary configuration for electrically connecting touch node electrodes 402 in touch screen 400 to sense channels 408 according to examples of the disclosure. In some examples, sense channels 408 can be located in a touch controller separate from the touch screen, but in some examples, the sense channels can be located on the touch screen. Touch screen 400 can include touch node electrodes 402, as described above. Components of touch screen 400 other than touch node electrodes 402 are not illustrated for ease of description. Each of touch node electrodes 402 can be electrically connected to sense channels 408 through sense connections 404 and connection points 406. In some examples, sense connections 404 can connect touch node electrodes 402 to a location on the touch screen (e.g., a flex circuit connection area) from which a separate connection (e.g., a flex circuit) can complete the connection to sense channels 408 (e.g., when the sense channels are located separate from touch screen 400). In some examples, sense connections 404 can connect touch node electrodes 402 directly to sense channels 408 (e.g., when the sense channels are located on touch screen 400). In some examples, connection points 406 can be vias when sense connections 404 and touch node electrodes 402 reside in different layers of touch screen 400 (e.g., when the sense connections reside underneath the touch node electrodes, or when the sense connections reside on top of the touch node electrodes); it is understood, however, that in some examples, the sense connections and the touch node electrodes can reside in the same layer of the touch screen, and the connection points can represent a location where the sense connections and the touch node electrodes connect. As discussed above, in some examples, connection points 406 can allow for an electrical connection between touch node electrodes 402 and sense connections 404 through one or more intervening layers that may exist between the touch node electrodes and the sense connections in touch screen 400.

In connecting sense channels 408 and touch node electrodes 402, it can be beneficial to tune the load (e.g., the resistance and/or the capacitance) that each sense connection 404 presents to the sense channels so that the transient operation of the sense connections can achieve desired parameters (e.g., an RC time constant for each sense connection can be set to a desired value). The examples of the disclosure are directed to various techniques for achieving the above load tuning.

Although the examples of the disclosure are presented in the context of connecting touch node electrodes to sense circuitry (e.g., sense channels), it is understood that the techniques described can be utilized in any context in which load tuning of connections between components can be desired (e.g., connecting mutual capacitance drive lines to drive circuitry).

Figure 5:
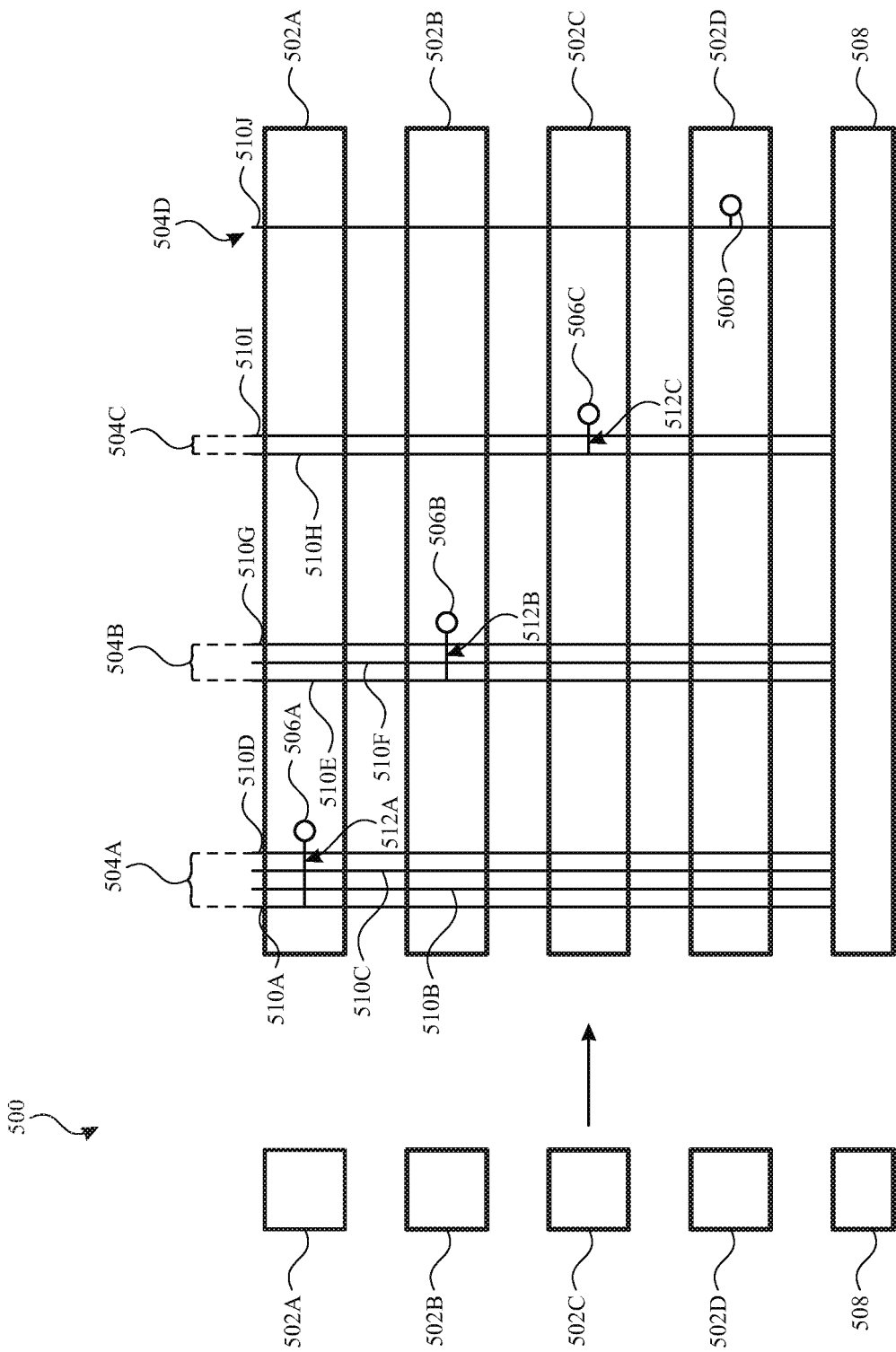
FIG. 5 illustrates an exemplary sense connection configuration in which longer sense connections can be made up of more traces than shorter sense connections according to examples of the disclosure.

FIG. 5 illustrates an exemplary sense connection configuration 500 in which longer sense connections 504 can be made up of more traces 510 than shorter sense connections according to examples of the disclosure. Touch node electrodes 502a, 502b, 502c and 502d (referred to collectively as touch node electrodes 502) can correspond to a column (or row) of touch node electrodes 402 on touch screen 400 in FIGS. 4A-4B, for example. Touch node electrodes 502a-d are illustrated as being expanded in the horizontal dimension for ease of illustration. Each touch node electrode 502 can be coupled to sense circuitry 508 (e.g., sense channels 208) through respective connection points and sense connections—e.g., touch node electrode 502a can be coupled to the sense circuitry through connection point 506a and sense connection 504a. The remaining touch node electrodes 502 can be similarly coupled to sense circuitry 508, as illustrated. Sense connections 504a-d (referred to collectively as sense connections 504) can correspond to sense connections 404 in FIGS. 4A-4B, and connection points 506a-d (referred to collectively as connection points 506) can correspond to connection points 406 in FIGS. 4A-4B, for example.

Because sense connections 504 that are coupled to touch node electrodes 502 that are towards the top of the touch screen (e.g., relatively far away from sense circuitry 508, such as touch node electrode 502a) may be longer than sense connections coupled to touch node electrodes that are towards the bottom of the touch screen (e.g., relatively close to the sense circuitry, such as touch node electrode 502d), it can be beneficial to reduce the resistance per unit length of the sense connections coupled to the touch node electrodes towards the top of the touch screen with respect to the sense connections coupled to the touch node electrodes towards the bottom of the touch screen, so that the total effective resistances of the sense connections do not differ greatly (e.g., do not differ by more than a threshold resistance). In some examples, to achieve the above, sense connections 504 can be made up of one or more traces 510. For example, sense connection 504a can be made up of traces 510a, 510b, 510c and 510d connecting, in parallel, a given sense channel (e.g., sensing circuit 314 in FIG. 3A) in sense circuitry 508 to touch node electrode 502a. Traces 510a, 510b, 510c and 510d can be electrically connected together at touch node electrode 502 (e.g., at connection point 506a) using bridge 512a. Further, in some examples, traces 510a, 510b, 510c and 510d can extend to the top of touch screen 500, as illustrated. Traces 510a, 510b, 510c and 510d and/or bridge 512a can be composed of any electrically conductive material, such as indium tin oxide (ITO). Further, in some examples, traces 510a, 510b, 510c and 510d (and other traces 510) can be routed underneath data lines in the touch screen, and bridge 512a (and other bridges 512) can be routed underneath gate lines in the touch screen so as to reduce the impact of the traces and/or bridges on the aperture ratio of the touch screen. The effective resistance that sense connection 504a can present to sense circuitry 508 can be the resistance of traces 510a, 510b, 510c and 510d in parallel along a length from the sense circuitry to touch node electrode 502a (or connection point 506a). The effective capacitance that sense connection 504a can present to sense circuitry 508 can be, substantially, the sum of the capacitances seen by each of traces 510a, 510b, 510c and 510d (e.g., capacitances between the traces and other touch screen components) along a total length of the traces (e.g., $4C_T$, if $C_T$ corresponds to the capacitance seen by a single trace 510a, b, c or d). Further, in some examples, touch node electrode 502a can also present a capacitance to sense circuitry 508, via sense connection 504a, which can be included in the effective capacitance that sense connection 504a can present to the sense circuitry.

Sense connections 504b, 504c and 504d can be similar in configuration to sense connection 504a, except that sense connections 504b, 504c and 504d can be made up of fewer traces 510 than sense connection 504a, because touch node electrodes 502b, 502c and 502d can be closer to sense circuitry 508 than is touch node electrode 502a, and thus fewer traces 510 may be required to achieve a desired effective resistance for sense connections 504b, 504c and 504d. For example, sense connection 504b, which can be made up of traces 510e, 510f and 510g, can connect, in parallel, a given sense channel (e.g., sensing circuit 314 in FIG. 3A) in sense circuitry 508 to touch node electrode 502b. Traces 510e, 510f and 510g can be electrically connected together at touch node electrode 502b (e.g., at connection point 506b) using bridge 512b. Further, in some examples, traces 510e, 510f and 510g can extend to the top of touch screen 500, as illustrated. The effective resistance that sense connection 504b can present to sense circuitry 508 can be the resistance of traces 510e, 510f and 510g in parallel along a length—less than the length from the sense circuitry to touch node electrode 502a described with reference to sense connection 504a—from the sense circuitry to touch node electrode 502b (or connection point 506b). The effective capacitance that sense connection 504b can present to sense circuitry 508 can be the sum of the capacitances seen by each of traces 510e, 510f and 510g along a total length of the traces (e.g., $3C_T$, if $C_T$ corresponds to the capacitance seen by a single trace 510a, b, c or d). Further, in some examples, touch node electrode 502b can also present a capacitance to sense circuitry 508, via sense connection 504b, which can be included in the effective capacitance that sense connection 504b can present to the sense circuitry.

Sense connections 504c and 504d can analogously present effective resistances and capacitances ($2C_T$ and $C_T$, respectively) to sense circuitry 508 via traces 510h and 510i (corresponding to sense connection 504c) and trace 510j (corresponding to sense connection 504d). As shown above, increasing the number of traces 510 in a sense connection 504 can reduce the resistance of the sense connection, but can also increase the capacitance of the sense connection. In some examples, the number of traces in various sense connections 504 can be adjusted until the RC time constant of the worst-performing sense connection-touch node electrode pair is minimized.

As described above, sense connection configuration 500 of FIG. 5, in which sense connections 504 for touch node electrodes 502 further away from sense circuitry 508 can include more traces connected in parallel than sense connections for touch node electrodes closer to the sense circuitry, can work to reduce the effective resistances of longer sense connections, and thus improve the RC time constants (and correspondingly, the bandwidths) of those sense connections. However, in some examples, additional design flexibility may be desired. Specifically, the resistances and/or capacitances that sense connections present to the sense circuitry of the touch screen of the disclosure can be tuned such that the RC time constants (and thus bandwidths) of sense connections that are made up of equal numbers of traces can substantially match, despite those sense connections having different lengths (e.g., due to being electrically connected to touch node electrodes that are disposed at different distances from the sense circuitry of the touch screen). This can be accomplished by independently varying the resistance per unit length of the sense connections such that the sense connections have substantially equal RC time constants (and thus bandwidth), as will be described in more detail below. Additionally, sense connections that are made up of different numbers of traces can be similarly configured to have RC time constants (and thus bandwidths) that substantially match, or deviate less than a threshold from, the RC time constants of other sense connections that are made up of different numbers of traces. Such a sense connection scheme can be referred to as a "semi-RC matching" scheme, because while the RC time constants of sense connections having equal numbers of traces can be matched, the RC time constants of sense connections having different numbers of traces may not be.

Figure 6A:
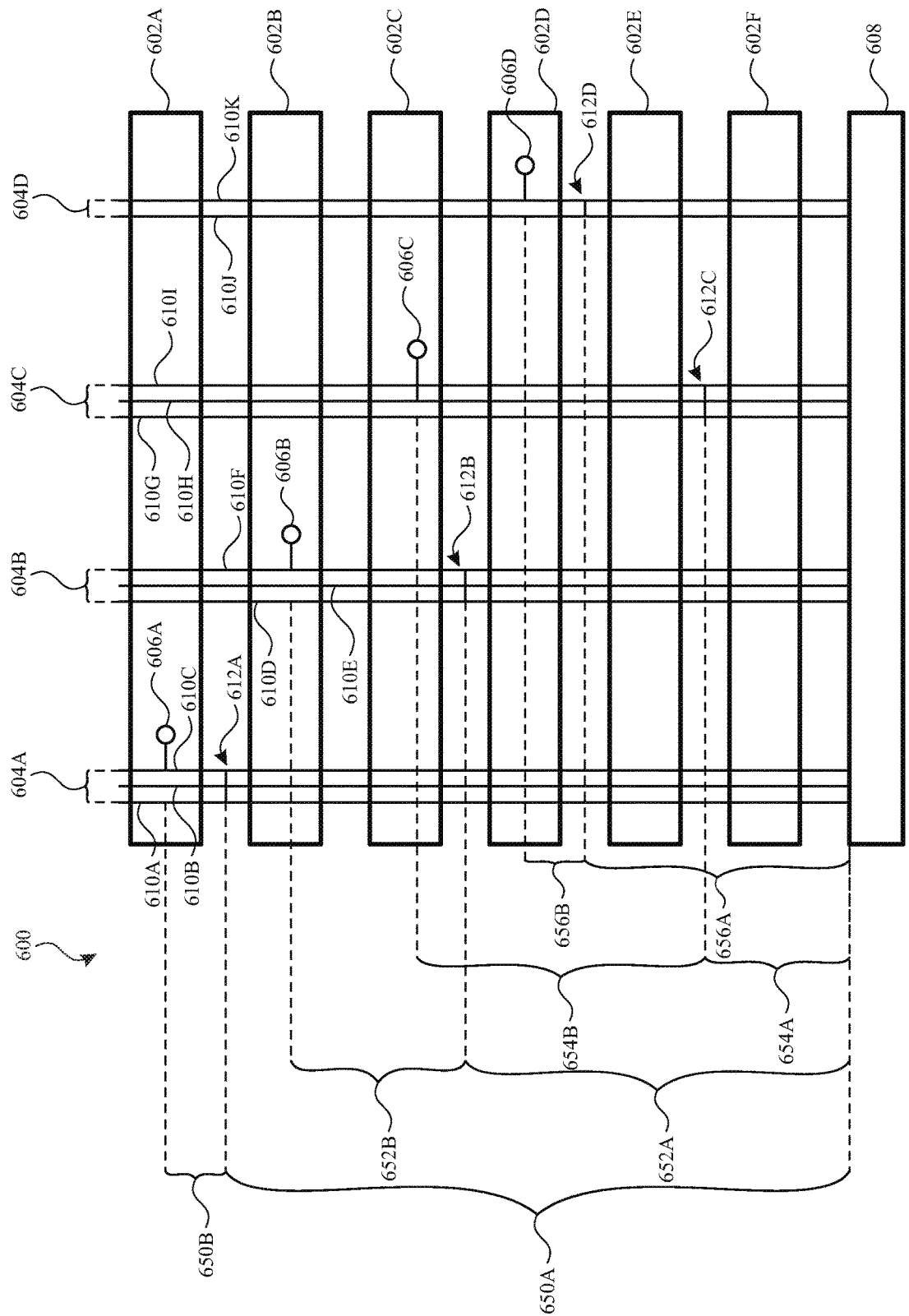
FIG. 6A-6B illustrate a "semi-RC matching" sense connection configuration and exemplary characteristics of a "semi-RC matching" sense connection configuration according to examples of the disclosure.

FIG. 6A illustrates a "semi-RC matching" sense connection configuration 600 according to examples of the disclosure. Sense connection configuration 600 can be similar to sense connection configuration 500 in FIG. 5, except as described below. Touch node electrode 602a can be coupled to sense circuitry 608 via sense connection 604a, touch node electrode 602b can be coupled to the sense circuitry via sense connection 604b, touch node electrode 602c can be coupled to the sense circuitry via sense connection 604c, and touch node electrode 602d can be coupled to the sense circuitry via sense connection 604d. Touch node electrodes 602e and 602f can be disposed between touch node electrode 602d and sense circuitry 608 on the touch screen, and can also be coupled to the sense circuitry, though via sense connections not illustrated in FIG. 6A.

As previously described, the effective resistances of two or more sense connections on the touch screen can be substantially matched by varying the resistance per unit length of the sense connections such that the sense connections have substantially equal RC time constants (and thus bandwidth). Specifically, in FIG. 6A, two or more sense connections on the touch screen can be made up of equal numbers of traces. For example, sense connection 604a can be made up of traces 610a, 610b and 610c, sense connection 604b can be made up of traces 610d, 610e and 610f, and sense connection 604c can be made up of traces 610g, 610h and 610i. The capacitances presented to sense circuitry 608 by sense connections 604a, 604b and 604c can be substantially equal (e.g., $3C_T$, if $C_T$ corresponds to the capacitance presented by a single trace 610a, b, c, d, e, f, g, h or i), because traces 610 in those sense connections can all have total lengths that are substantially equal (e.g., from sense circuitry 608 up to/through touch node electrode 602a, as illustrated in FIG. 6A). The effective resistances of sense connections 604a, 604b and 604c can also be made substantially equal, as will be described below, to make the RC time constants (and thus the bandwidths) of sense connections 604a, 604b and 604c substantially equal.

Specifically, sense connections 604a, 604b and 604c can comprise two or more portions, each portion including the same number of traces 610, but each portion having different numbers of traces that are within the signal path between the corresponding touch node electrodes 602a, 602b and 602c, respectively, and sense circuitry 608; thus, the resistance per unit length of these sense connections can vary along the lengths of the sense connections. For example, sense connection 604a can include a first portion 650a between sense circuitry 608 and bridge 612a (which can electrically couple together traces 610a, 610b and 610c), and a second portion 650b between bridge 612a and connection point 606a connecting to touch node electrode 602a. The first portion 650a of sense connection 604a can include the same number of traces 610 as the second portion 650b of the sense connection. However, the first portion 650a of sense connection 604a can have a different number of traces 610 that are within the signal path between touch node electrode 602a and sense circuitry 608 than the second portion 650b of sense connection 604a. Specifically, in portion 650a of sense connection 604a, all three of traces 610a, 610b and 610c can be within the signal path between touch node electrode 602a and sense circuitry 608 (e.g., because all three of traces 610a-c can be electrically connected in parallel between touch node electrode 602a and sense circuitry 608). In contrast, in portion 650b of sense connection 604a, only trace 610c can be within the signal path between touch node electrode 602a and sense circuitry 608, because only trace 610c may carry a signal (e.g., a touch signal) from touch node electrode 602a to sense circuitry 608—traces 610a and 610b in portion 650b of sense connection 604a may be electrically connected to touch node electrode 602a, but may be open-circuited in portion 650b, and thus may not carry the signal from touch node electrode 602a to sense circuitry 608. As such, the resistance per unit length of sense connection 604a in portion 650a (e.g., the equivalent resistance per unit length of three traces 610 connected in parallel) can be lower than the resistance per unit length of sense connection 604a in portion 650b (e.g., the equivalent resistance per unit length of one trace 610c).

By controlling the numbers of traces in a sense connection that are within the signal path between a touch node electrode and the sense circuitry, as well as the lengths of the various portions of the sense connection, the effective resistance of the sense connection can be set as desired (e.g., can be made substantially equal to other sense connections). Further, the capacitances of the various sense connections that have the same number of traces can remain substantially equal regardless of the resistance set above, because the capacitances of the sense connections can be substantially determined by the number of traces making up the sense connections, which can be constant. For example, sense connection 604b, like sense connection 604a, can include three traces 610d-f; thus, the capacitance presented by sense connection 604b to sense circuitry 608 can be substantially equal to the capacitance presented by sense connection 604a to sense circuitry 608. Similar to sense connection 604a, portion 652a of sense connection 604b can include traces 610d, 610e and 610f connected in parallel (via bridge 612b), and portion 652b of sense connection 604b can include trace 610f connected to connection point 606b at touch node electrode 602b. The lengths of portions 652a and 652b of sense connection 604b can be adjusted (e.g., based on the placement of bridge 612b) so that the total effective resistance of sense connection 604b is substantially equal to the total effective resistance of sense connection 604a. For example, in FIG. 6A, portion 652a of sense connection 604b can be shorter in length than portion 650a of sense connection 604a, and portion 652b of sense connection 604b can be longer in length than portion 650b of sense connection 604a. Because the capacitances and effective resistances of sense connections 604a and 604b can be substantially equal, their RC time constants (and thus their operating bandwidths) can be substantially equal.

Finally, sense connection 604c can similarly have substantially the same capacitance as sense connections 604a and 604b. The effective resistance of sense connection 604c can be set, as described above, to be substantially equal to the effective resistances of sense connections 604a and 604b. Specifically, sense connection 604c can include portion 654a having traces 610g-i connected in parallel (via bridge 612c), and portion 654b in which traces 610h-i can be connected in parallel and to connection point 606c. Thus, portion 654b of sense connection 604c can include two traces connected in parallel to connection point 606c, whereas portion 652b of sense connection 604b and portion 650b of sense connection 604a can include a single trace connected to connection points 606b and 606a, respectively. The lengths of portions 654a and 654b of sense connection 604c can be adjusted (e.g., based on the placement of bridge 612c) so that the total effective resistance of sense connection 604c is substantially equal to the total effective resistances of sense connections 604a and 604b. For example, in FIG. 6A, portion 654a of sense connection 604c can be shorter in length than portions 650a of sense connection 604a and 652a of sense connection 604b, and portion 654b of sense connection 604c can be longer in length that portions 650b of sense connection 604a and 652b of sense connection 604b. Because the capacitances and effective resistances of sense connections 604a, 604b and 604c can be substantially equal, their RC time constants (and thus their operating bandwidths) can be substantially equal.

It should be noted that as is illustrated in FIG. 6A, the number of traces within the signal path of a given sense connection can vary differently in different sense connections, even though those sense connections can include the same number of total traces. For example, sense connections 604A, 604B and 604C can all include the same number of total traces (e.g., three traces). However, in sense connections 604A and 604B, the number of traces within the signal paths in those sense connections can vary from three traces in the respective lower portions of those sense connections (e.g., portions 650A and 652A) to one trace in the respective upper portions of those sense connections (e.g., portions 650B and 652B), while the number of traces within the signal path of sense connection 604C can vary from three traces in the lower portion of that sense connection (e.g., portion 654A) to two traces in the upper portion of that sense connection (e.g., portion 654B). Other similar variations are also possible (e.g., some signal paths varying from four traces to one trace, from four traces to two traces, and from four traces to three traces).

Sense connection 604d can include traces 610j-k—fewer traces than in sense connections 604a-c. Thus, the capacitance of sense connection 604d can differ substantially from the capacitances of sense connections 604a-c. However, the effective resistance of sense connection 604d can be set, as described above, such that the RC time constant (and thus the bandwidth) of sense connection 604d is substantially equal to, or within a threshold of, the RC time constants of sense connections 604a-c. Similar to sense connections 604a-604c, sense connection 604d can include portions with different numbers of traces within the signal path from touch node electrode 602d to sense circuitry 608. Specifically, portion 656a of sense connection 604d can include traces 610j-k connected in parallel (via bridge 612d), and portion 656b of sense connection 604d can include trace 610k connected to connection point 606d. The lengths of portions 656a and 656b of sense connection 604d can be adjusted (e.g., based on the placement of bridge 612d), as described above, to achieve an appropriate effective resistance for sense connection 606d (e.g., to substantially match the effective resistances of other sense connections on the touch screen that are made up of two traces (not illustrated)).

Figure 7:
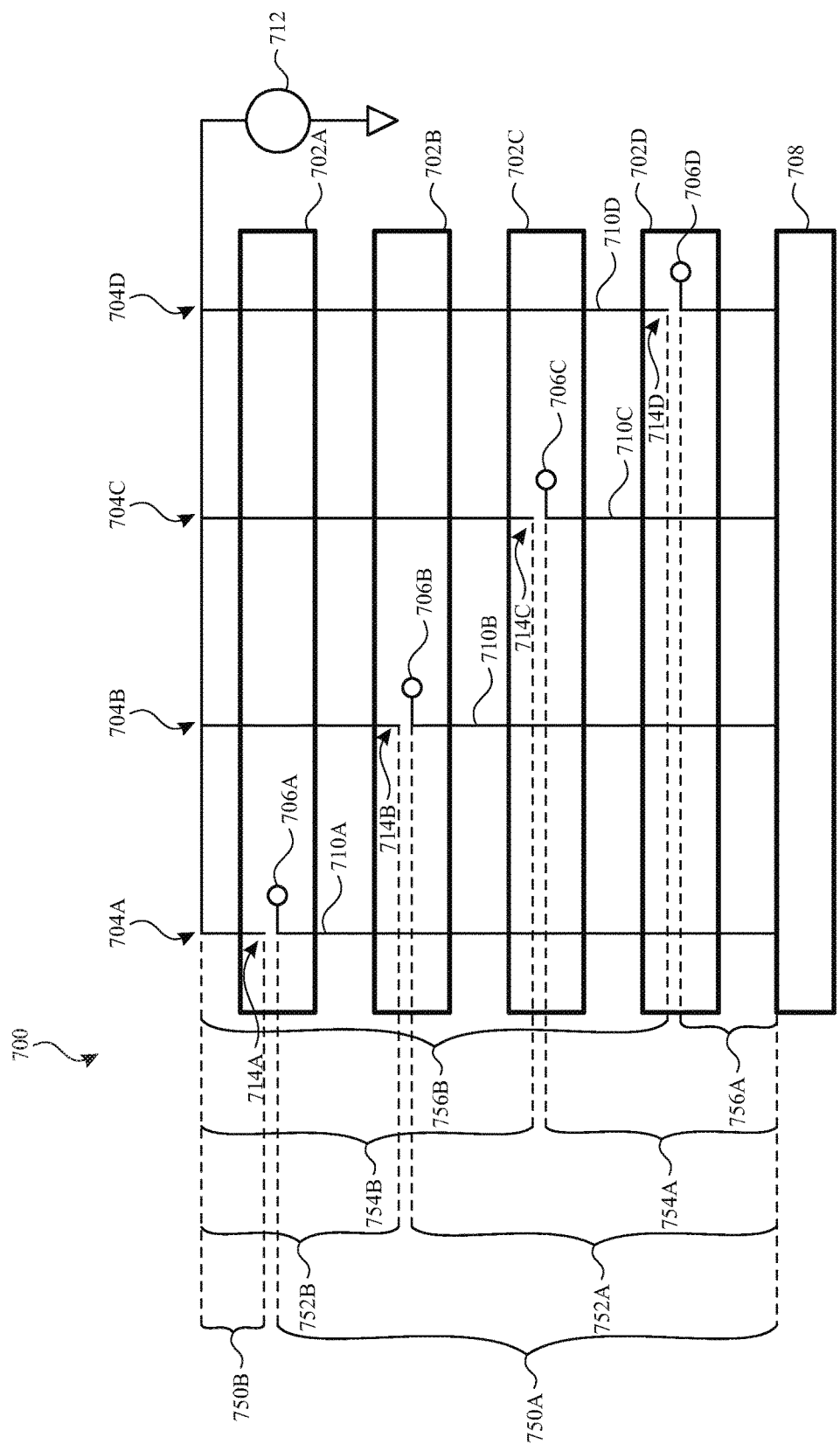
FIG. 7 illustrates a sense connection configuration in which excess portions of traces in a sense connection can be decoupled from the remainder of the traces in the sense connection to reduce a load presented to sense circuitry according to examples of the disclosure.
Figure 8:
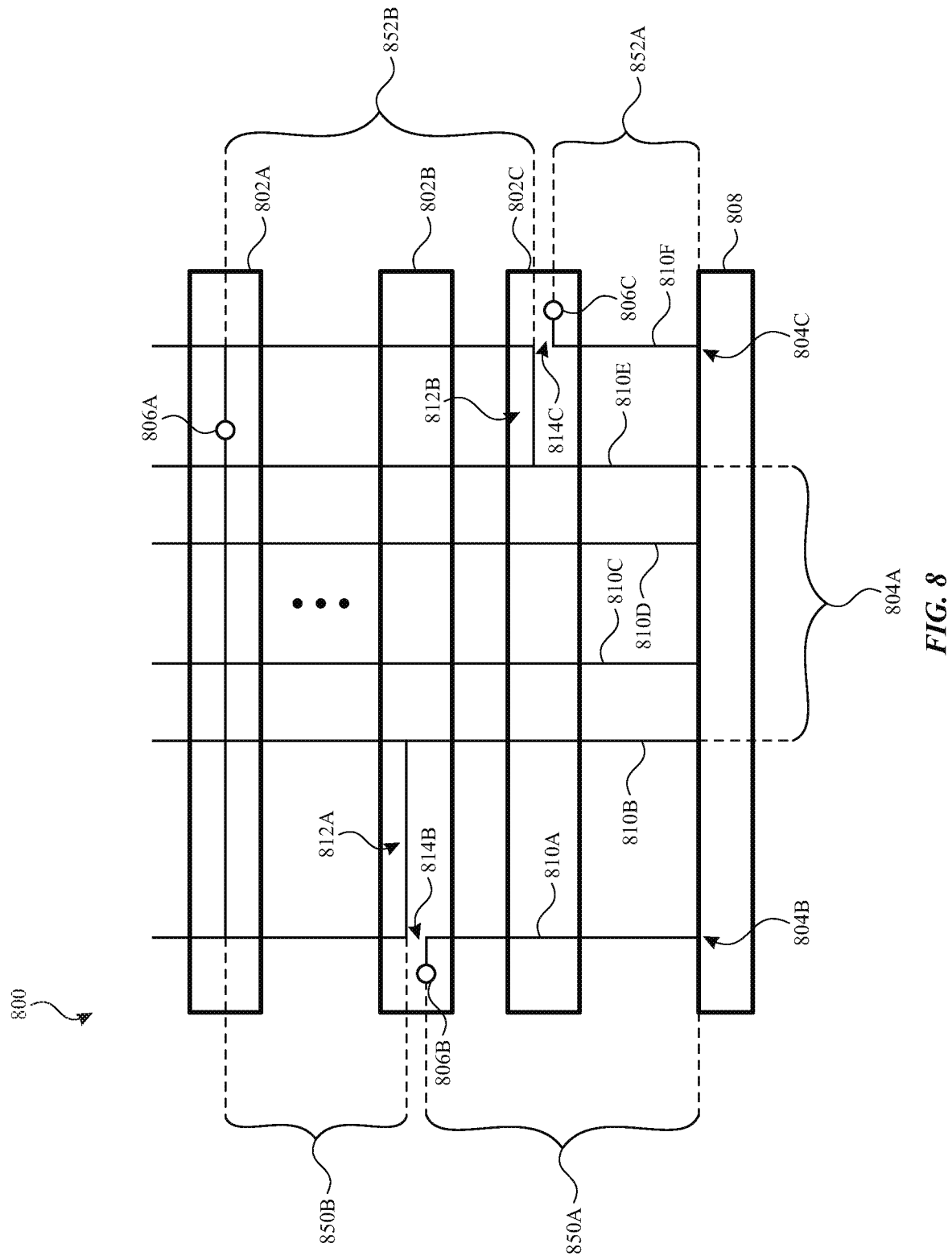
FIG. 8 illustrates a sense connection configuration in which cut portions of traces in a sense connection are re-used by other sense connections according to examples of the disclosure.
Figure 9:
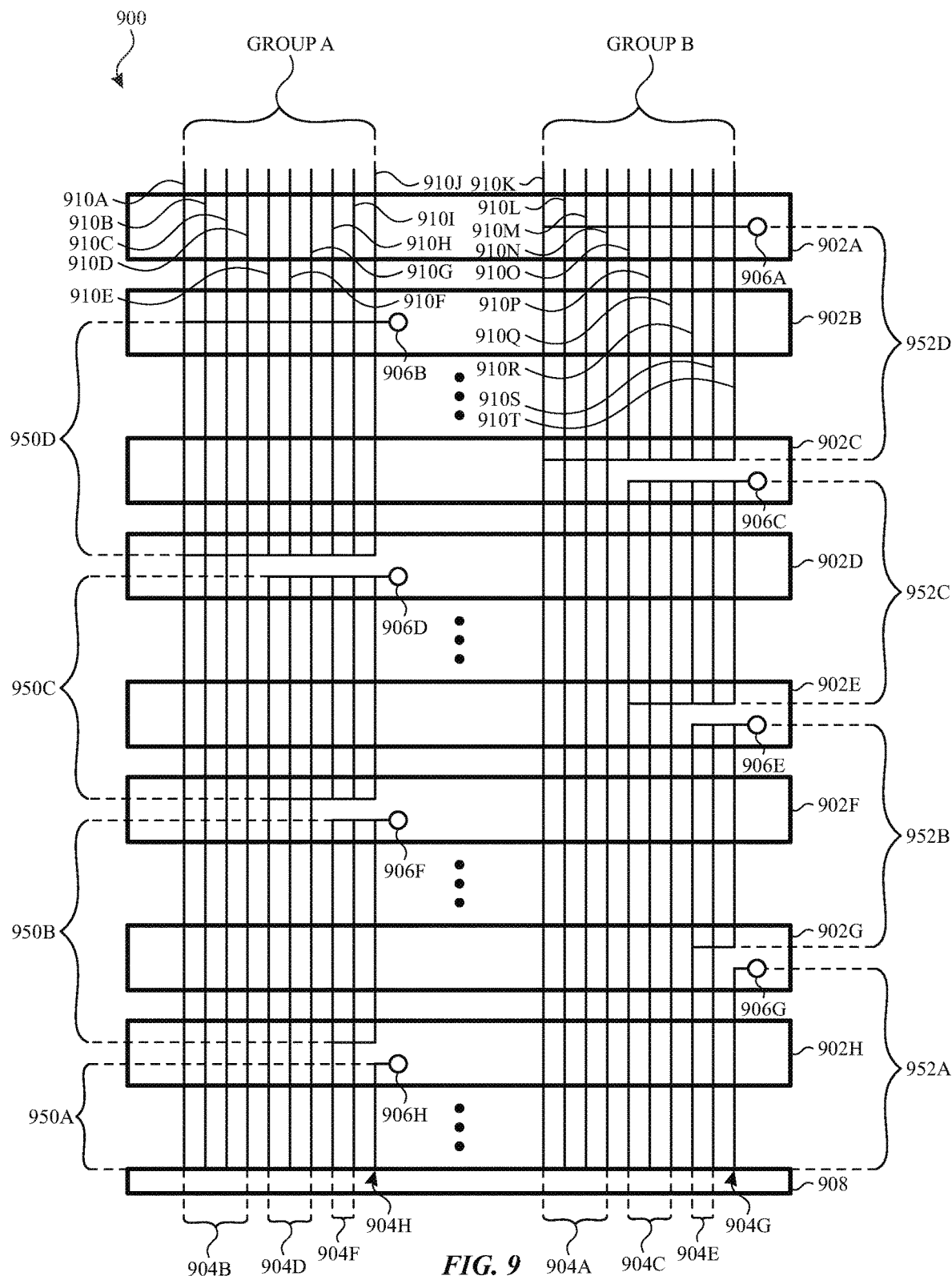
FIG. 9 illustrates a sense connection configuration in which cut portions of traces are used by multiple sense connections to reduce the resistances of those sense connections according to examples of the disclosure.

In some examples, the portions of traces 610 that are not within the signal paths from a touch node electrode 602 to sense circuitry 608 can be decoupled (e.g., electrically isolated) from the portions of traces 610 that are within the signal paths from a touch node electrode 602 to sense circuitry 608, similar to as described in FIG. 7. For example, in portion 652B of sense connection 604B, traces 610D and 610E can be decoupled from (e.g., cut from) traces 610 D and 610E in portion 652A of sense connection 604B. Similarly, trace 610F above portion 652B of sense connection 604B can be decoupled from (e.g., cut from) trace 610F in portion 652B of sense connection 604B. In some examples, these decoupled portions of traces 610 can be floating, or can be coupled to a power source (e.g., AC or DC power source), as shown in FIG. 7. Further, in some examples, these decoupled portions of traces 610 can be coupled to neighboring sense connections to reduce the resistances of those sense connections, as shown in FIGS. 8-9. By decoupling these portions of traces that are not within the signal paths from a touch node electrode 602 to sense circuitry 608, the capacitive load presented to the sense circuitry 608 can be reduced. As an alternative, in some examples, the portions of traces 610 that are not within the signal paths from a touch node electrode 602 to sense circuitry 608, instead of being decoupled as described above, can be nonexistent. That is to say that in some examples, traces may end at bridges 612 if the extensions of those traces past bridges 612 would not be within the signal paths of their corresponding sense connections. For example, trace 610D in sense connection 604B can end at bridge 612B such that trace 610D may not extend into or above region 652B of sense connection 604B.

Further, in some examples, the signal path between sense circuitry 608 and a given touch node electrode 602 may not extend above that given touch node electrode 602 (e.g., the signal path may be wholly contained within the area of the given touch node electrode 602 and/or between the given touch node electrode 602 and sense circuitry 608). For example, in sense connection 604B, the signal path between touch node electrode 602B and sense circuitry may not extend above touch node electrode 602B (e.g., may not extend into the gap between touch node electrodes 602A and 602B, or into touch node electrode 602A), and may be wholly contained within the area of touch node electrode 602B and/or between touch node electrode 602B and sense circuitry 608 on the touch sensor panel.

Figure 6B:
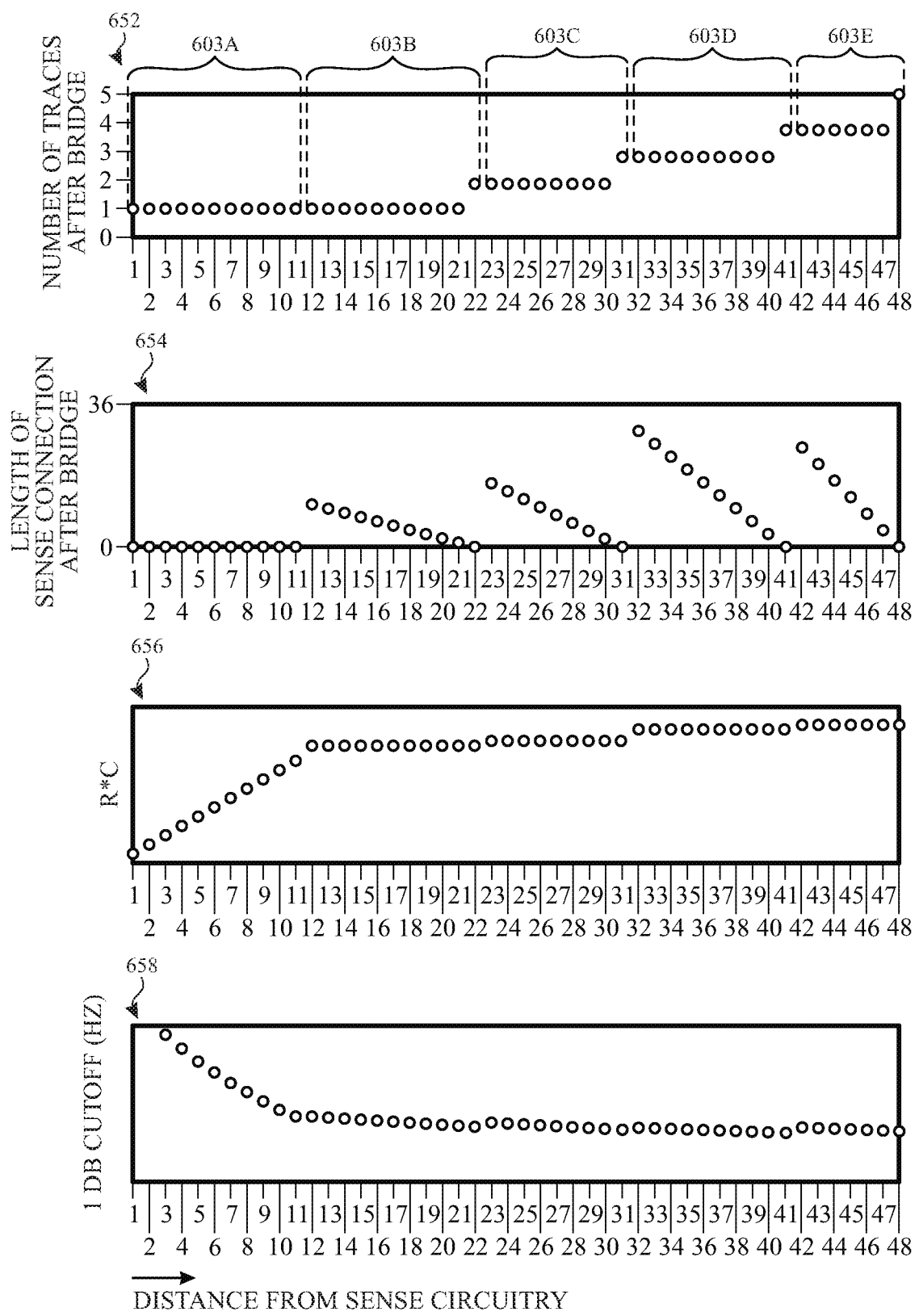

FIG. 6B illustrates various characteristics of an example "semi-RC matching" sense connection configuration according to the examples of FIG. 6A in which the maximum number of traces in a given sense connection is five, according to examples of the disclosure. Plot 652 can indicate the number of traces that are within the signal paths of the sense connections after the bridge in those sense connections (e.g., the number of traces in portions 650B, 652B, 654B, 656B of sense connections 604), plot 654 can indicate the lengths of the signal paths of the sense connections after the bridge in those sense connections (e.g., the lengths of portions 650B, 652B, 654B, 656B of sense connections 604), plot 656 can indicate the RC time constants of the sense connections, and plot 658 can indicate the 1 dB cutoff frequency (Hz) of the sense connections. It is understood that plots 652, 654, 656 and 658 provide example details of a "semi-RC matching" sense connection configuration, but that other "semi-RC matching" sense connection configurations according to the examples provided herein are within the scope of this disclosure.

Plots 652, 654, 656 and 658 can correspond to sense connections for a column of touch node electrodes on a touch sensor panel (or a row of touch node electrodes on the touch sensor panel, or any other arrangement of touch node electrodes on the touch sensor panel). The horizontal axes of each of plots 652, 654, 656 and 658 can correspond to the position of each touch node electrode on the touch sensor panel corresponding to those sense connections. For example, the left-most unit on the horizontal axis can correspond to a sense connection for a touch node electrode that is closest to the sense circuitry (e.g., the lower-most touch node electrode in the column of touch node electrodes in a circumstance in which the sense circuitry is located at or close to the bottoms of the columns of touch node electrodes, as in FIGS. 5-9), and the right-most unit on the horizontal axis can correspond to a sense connection for a touch node electrode that is furthest from the sense circuitry (e.g., the upper-most touch node electrode in the column of touch node electrodes in a circumstance in which the sense circuitry is located at or close to the bottoms of the columns of touch node electrodes, as in FIGS. 5-9).

The sense connections represented in FIG. 6B can include five sets of sense connections: set 603A (sense connections having one trace, and corresponding to the 11 touch node electrodes closest to the sense circuitry), set 603B (sense connections having two traces, and corresponding to the next 11 touch node electrodes closest to the sense circuitry), set 603C (sense connections having three traces, and corresponding to the next eight touch node electrodes closest to the sense circuitry), set 603D (sense connections having four traces, and corresponding to the next ten touch node electrodes closest to the sense circuitry) and set 603E (sense connections having five traces, and corresponding to the eight touch node electrodes furthest from the sense circuitry).

As mentioned above, sense connections in set 603E can include five traces. As shown in plot 652, the sense connection corresponding to the touch node electrode furthest from the sense circuitry can include five sense connections within its signal path the entire distance from the sense circuitry to the touch node electrode. The other sense connections in set 603E can include a bridge (e.g., bridges 612 in FIG. 6A) at which the number of sense connections within their signal paths can be reduced from five to four. The lengths of the upper portions of those sense connections (e.g., portions 650B, 652B, 654B, 656B in FIG. 6A) can gradually increase, as shown in plot 654, as the sense connections correspond to touch node electrodes closer to the sense circuitry (moving leftward in plots 652 and 654). As previously mentioned, sense connections in set 603D can include four traces. As shown in plot 652, the sense connection in set 603D corresponding to the touch node electrode furthest from the sense circuitry can include four sense connections within its signal path the entire distance from the sense circuitry to the touch node electrode. The other sense connections in set 603D can include a bridge (e.g., bridges 612 in FIG. 6A) at which the number of sense connections within their signal paths can be reduced from four to three. The lengths of the upper portions of those sense connections (e.g., portions 650B, 652B, 654B, 656B in FIG. 6A) can gradually increase (in some examples, more slowly than do the lengths of the upper portions of the sense connections in set 603E), as shown in plot 654, as the sense connections correspond to touch node electrodes closer to the sense circuitry (moving leftward in plots 652 and 654).

As previously mentioned, sense connections in set 603C can include three traces. As shown in plot 652, the sense connection in set 603C corresponding to the touch node electrode furthest from the sense circuitry can include three sense connections within its signal path the entire distance from the sense circuitry to the touch node electrode. The other sense connections in set 603C can include a bridge (e.g., bridges 612 in FIG. 6A) at which the number of sense connections within their signal paths can be reduced from three to two. The lengths of the upper portions of those sense connections (e.g., portions 650B, 652B, 654B, 656B in FIG. 6A) can gradually increase (in some examples, more slowly than do the lengths of the upper portions of the sense connections in set 603D), as shown in plot 654, as the sense connections correspond to touch node electrodes closer to the sense circuitry (moving leftward in plots 652 and 654). As previously mentioned, sense connections in set 603B can include two traces. As shown in plot 652, the sense connection in set 603B corresponding to the touch node electrode furthest from the sense circuitry can include two sense connections within its signal path the entire distance from the sense circuitry to the touch node electrode. The other sense connections in set 603B can include a bridge (e.g., bridges 612 in FIG. 6A) at which the number of sense connections within their signal paths can be reduced from two to one. The lengths of the upper portions of those sense connections (e.g., portions 650B, 652B, 654B, 656B in FIG. 6A) can gradually increase (in some examples, more slowly than do the lengths of the upper portions of the sense connections in set 603C), as shown in plot 654, as the sense connections correspond to touch node electrodes closer to the sense circuitry (moving leftward in plots 652 and 654). Finally, as previously mentioned, sense connections in set 603A can include a single trace. As shown in plot 652, the sense connections in set 603A can include a single trace within their signal paths the entire distance from the sense circuitry to the touch node electrodes. The lengths of the sense connections can gradually decrease as the sense connections correspond to touch node electrodes closer to the sense circuitry (moving leftward in plots 652 and 654).

Focusing on plot 656, sense connections in set 603E can have the same (e.g., within 10% of each other) RC time constants, sense connections in set 603D can have the same (e.g., within 10% of each other) RC time constants (in some examples, lower than the RC time constants of the sense connections in set 603E), sense connections in set 603C can have the same (e.g., within 10% of each other) RC time constants (in some examples, lower than the RC time constants of the sense connections in set 603D), and sense connections in set 603B can have the same (e.g., within 10% of each other) RC time constants (in some examples, lower than the RC time constants of the sense connections in set 603C). Sense connections in set 603A can have lower RC time constants than sense connections in set 603B. However, the RC time constants of sense connections in set 603A can gradually increase as the sense connections correspond to touch node electrodes further from the sense circuitry (moving rightward in plot 656).

Finally, focusing on plot 658, the performance of the lowest-performing sense connection in each set of sense connections can be the same (e.g., within 10% of one another). For example, the 1 dB cutoff frequency of the lowest-performing sense connection in sets 603A, 603B, 603C, 603D and 603E can be the same (e.g., within 10% of one another). In some examples, the lowest-performing sense connection in each set of sense connections can be the sense connection that corresponds to the touch node electrode furthest from the sense circuitry in that set (e.g., the right-most sense connection in each set in plot 658). The 1 dB cutoff frequencies of the other sense connections in each set can gradually increase as the sense connections correspond to touch node electrodes closer to the sense circuitry (moving leftward in plot 658). In some examples, the rate of increase of the 1 dB cutoff frequencies of the sense connections in set 603A can be greater than the rates of increase of the 1 dB cutoff frequencies of the sense connections in sets 603B, 603C, 603D and 603E. Thus, as shown in plots 652, 654, 656 and 658, in some examples, the sense connections for a given column (or other collection) of touch node electrodes can transition from including five traces (set 603E) to including four traces (set 603D), from including four traces (set 603D) to including three traces (set 603C), from including three traces (set 603C) to including two traces (set 603B), and from including two traces (set 603B) to including one trace (603A) such that the lowest-performing sense connection in each set can have the same (e.g., within 10% of one another) bandwidth.

It is understood that in some examples, one or more sense connections in set 603A can have physical features that vary (e.g., increase) the resistances of select one(s) of the sense connections such that the RC time constants of the sense connections in set 603A are the same (e.g., within 10% of one another). For example, the trace forming the left-most sense connection in set 603A (corresponding to the sense connection for the touch node electrode closest to the sense circuitry) can be extended or lengthened (e.g., can extend up past the touch node electrode to which it corresponds, and can loop back down to finally couple to the touch node electrode, can include a zigzag pattern, etc.) to increase its resistance such that the RC time constant of that sense connection is the same as (e.g., within 10% of) the RC time constant of the right-most sense connection in set 603A (corresponding to the sense connection for the touch node electrode furthest from the sense circuitry for that set of sense connections). The resistances of other sense connections in set 603A can similarly be increased such that the RC time constants of those sense connections are also the same as (e.g., within 10% of) the RC time constant of the right-most sense connection in set 603A. In this way, sense connections in set 603A can have substantially uniform RC time constants, similar to the RC time constants of sense connections in sets 603B, 603C, 603D and 603E.

Further, such trace- and/or sense connection-extension as discussed above (e.g., sense connection routing from the sense circuitry to the touch node electrodes that is indirect, such as by looping up past the touch node electrodes and then back down to couple to the touch node electrodes, zigzag routing of the traces/sense connections, etc.) can, more generally, be implemented in any of the traces/sense connections in sets 603A, 603B, 603C, 603D and 603E. In other words, sense connections in sets 603A, 603B, 603C, 603D and/or 603E need not be routed to their corresponding touch node electrodes in the most direct (e.g., shortest, straight line, etc.) manner Rather, those sense connections can be routed to their corresponding touch node electrodes in a more indirect manner while still exhibiting the characteristics of the sense connections described with reference to FIGS. 6A-6B. As such, in such circumstances, the "distance from the sense circuitry" reflected in FIG. 6B can be a function of or correspond to the lengths of the traces/sense connections of touch node electrodes rather than purely to the distances of those touch node electrodes from the sense circuitry. Further, more generally, traces/sense connections illustrated in and described with reference to FIGS. 5, 7 and 8-9 can similarly be routed in a more indirect manner while still exhibiting the described characteristics of those routing schemes.

FIG. 7 illustrates sense connection configuration 700 in which excess portions of traces in a sense connection can be decoupled from the remainder of the traces in the sense connection to reduce a load presented to sense circuitry 708 according to examples of the disclosure. Sense connection configuration 700 can be similar to sense connection configuration 500 in FIG. 5, except as described below. In FIG. 7, touch node electrode 702a can be coupled to sense circuitry 708 via sense connection 704a, which, in the example illustrated, can be made up of one trace 710a, though the principles described with reference to FIG. 7 can be applied to sense connections having more than one trace in accordance with the examples of the disclosure. Trace 710a can be continuous from sense circuitry 708 until it couples to touch node electrode 702a at connection point 706a. In order to reduce the capacitive load presented to sense circuitry 708 by sense connection 704a, trace 710a can include break 714a, which can electrically decouple portion 750a of trace 710a below connection point 706a from portion 750b of trace 710a above connection point 706a (e.g., the portion of trace 710a that is not within the signal path between touch node electrode 702a and sense circuitry 708). In this way, the capacitive load presented by portion 750b of trace 710a above connection point 706a can be isolated from sense circuitry 708. In some examples, portion 750b of trace 710a can be electrically coupled to a separate voltage source 712, which can apply a DC or AC potential to portion 750b of trace 710a (in some examples, the same potential as is being applied to portion 750a of trace 710a), so that portion 750b of trace 710a is not left floating as a potential source of parasitic capacitance. In some examples, however, portion 750b of trace 710a can be left electrically floating on the touch screen.

Traces 710 in sense connections 704b, 704c and 704d can similarly include breaks 714b, 714c and 714d for electrically decoupling portions 752a, 754a and 756a of traces 710b, 710c and 710d, respectively, within the signal paths between touch node electrodes 702 and sense circuitry 708 from portions 752b, 754b and 756b of traces 710b, 710c and 710d, respectively, not within the signal paths between touch node electrodes 702 and sense circuitry 708, as illustrated in FIG. 7. Additionally, portions 752b, 754b and 756b of traces 710b, 710c and 710d, respectively, can be electrically coupled to voltage source 712, similar to portion 750b of trace 710a, though in some examples, portions 752b, 754b and 756b can be left electrically floating on the touch screen.

In this way, the capacitive load presented by each sense connection 704 to sense circuitry 708 can be reduced, which can reduce the RC time constants (and thus increase the operating bandwidths) of the sense connections. For ease of description, portions 750b, 752b, 754b and 756b of traces 710a, 710b, 710c and 710d can be referred to as the "cut portions" of traces 710a, 710b, 710c and 710d. Further, it is understood that while the example of FIG. 7 includes sense connections 704 each having a single trace 710, sense connections with more than one trace can similarly include breaks to decouple portions of the traces not within the signal paths between corresponding touch node electrodes 702 and sense circuitry 708 from the sense circuitry.

In some examples, the cut portions of traces above connection points to corresponding touch node electrodes can be utilized by sense connections of other touch node electrodes to reduce the resistances of those sense connections. FIG. 8 illustrates a sense connection configuration 800 in which cut portions of traces in a sense connection are re-used by other sense connections according to examples of the disclosure. FIG. 8 illustrates three touch node electrodes 802a, 802b and 802c. Among touch node electrodes 802a-c, touch node electrode 802a can be furthest from sense circuitry 808, touch node electrode 802c can be closest to sense circuitry 808, and touch node electrode 802b can be between touch node electrode 802a and touch node electrode 802c, as illustrated; in some examples, touch node electrode 802b can be adjacent touch node electrode 802c on the touch screen, though this need not be the case. In some examples, touch node electrode 802a can be adjacent touch node electrode 802b on the touch screen, though in FIG. 8, touch node electrode 802a and touch node electrode 802b can be separated by one or more other touch node electrodes (not illustrated).

Similar to as described with reference to FIG. 7, one or more of the traces in sense connections in FIG. 8 can include breaks after the traces are coupled to their corresponding touch node electrodes. For example, touch node electrode 802b can be coupled to sense circuitry 808 via sense connection 804b, which can include trace 810a. Trace 810a can electrically couple sense circuitry 808 to touch node electrode 802b at connection point 806b. After connection point 806b, trace 810a can include break 814b for decoupling portion 850b of trace 810a from portion 850a of trace 810a below connection point 806b (thus reducing the load presented by trace 810a to sense circuitry 808). Similarly, trace 810f in sense connection 804c can include break 814c after connection point 806c to reduce the load presented by trace 810f to sense circuitry 808.

In contrast to FIG. 7, in the configuration of FIG. 8, the portions of traces that are electrically decoupled from traces connected to sense circuitry 808 (e.g., portions 850b and 852b of traces 810a and 810f, respectively) can be electrically coupled to the traces of a sense connection of a touch node electrode that is further away from sense circuitry 808 to reduce the resistance of that sense connection. In other words, the cut portions of traces 810a and 810f can be re-used by sense connections of other touch node electrodes (e.g., touch node electrodes further away from sense circuitry 808) to reduce their resistance by reducing their resistance per unit length at one or more locations along the lengths of the sense connections. For example, in FIG. 8, sense connection 804a can couple touch node electrode 802a to sense circuitry 808. Sense connection 804a can include traces 810b, 810c, 810d and 810e electrically connected in parallel, which can all be electrically connected to connection point 806a at touch node electrode 802a. To reduce the resistance of sense connection 804a, portion 850b of trace 810a can also be electrically connected, in parallel, to traces 810b, 810c, 810d and 810e in sense connection 804a (e.g., via bridge 812a), which can reduce the resistance per unit length of sense connection 804a along the length of portion 850b of trace 810a. Additionally or alternatively, portion 852b of trace 810f can similarly be electrically connected, in parallel, to traces 810b, 810c, 810d and 810e in sense connection 804a (e.g., via bridge 812b), which can reduce the resistance per unit length of sense connection 804a along the length of portion 852b of trace 810f (in some examples, different from the length of portion 850b of trace 810a). In this way, portions 850b of trace 810a and 852b of trace 810f can be used to reduce the resistance of sense connection 804a. It is understood that while the example of FIG. 8 includes re-using cut portions of sense connections 804 having a single trace 810, cut portions of sense connections with more than one trace can similarly be re-used by other sense connections to reduce their resistance. Further, in some examples, cut portions of traces can be connected to adjacent traces in other sense connections, as illustrated in FIG. 8, while in other examples, cut portions of traces can be connected to traces in other sense connections that are not adjacent to the cut portions.

In some examples, cut portions of a trace can be reused multiple times to reduce the resistances of sense connections on the touch screen of the disclosure. FIG. 9 illustrates a sense connection configuration 900 in which cut portions of traces are used by multiple sense connections to reduce the resistances of those sense connections according to examples of the disclosure. In FIG. 9, touch node electrodes 902a-h are illustrated. In some examples, touch node electrodes 902b and 902c can be separated from each other by one or more other touch node electrodes (not illustrated), touch node electrodes 902d and 902e can be separated from each other by one or more other touch node electrodes (not illustrated), touch node electrodes 902f and 902g can be separated from each other by one or more other touch node electrodes (not illustrated), and touch node electrode 902h can be separated from sense circuitry 908 by one or more other touch node electrodes (not illustrated). In order to increase the ability to re-use cut portions of traces multiple times to reduce sense connection resistance, sense connection traces can be ordered in regularly repeating groups, as will be described below.

In FIG. 9, traces 910a-j can be included in Group A, and traces 910k-t can be included in Group B. Group A traces can be disposed in a first region of the touch screen, and Group B traces can be disposed in a second region of the touch screen, adjacent the first region. Group A traces can be used to couple touch node electrodes 902b, 902d, 902f and 902h to sense circuitry 908, and Group B traces can be used to couple touch node electrodes 902a, 902c, 902e and 902g to sense circuitry 908. Touch node electrodes 902b, 902d, 902f and 902h can be separated from each other by equal numbers of touch node electrodes, as can touch node electrodes 902a, 902c, 902e and 902g. For example, in a column of 48 touch node electrodes, touch node electrodes 902b, 902d, 902f and 902h can correspond to the $47^{th}$, $35^{th}$, $23^{rd}$ and $11^{th}$ touch node electrodes in the column, respectively, and touch node electrodes 902a, 902c, 902e and 902g can correspond to the $48^{th}$, $36^{th}$, $24^{th}$ and $12^{th}$ touch node electrodes in the column (e.g., the touch node electrodes corresponding to Group A and Group B traces can be separated from each other by 11 touch node electrodes). The column of touch node electrodes can include additional touch node electrodes, the sense connection traces for which can be configured analogously, and in a pattern similar to, as described here with reference Groups A and B of traces.

Focusing on the Group A traces (corresponding to touch node electrodes 902*b*, 902*d*, 902*f* and 902*h*), sense connection 904*h* can include trace 910*j*. Portion 950*a* of trace 910*j* can couple sense circuitry 908 to touch node electrode 902*h* at connection point 906*h*. Similar to as described with reference to FIG. 8, the remainder of trace 910*j* (e.g., the cut portion of trace 910*j* after connection point 906*h*) can be decoupled from portion 950*a* of trace 910*j*. Portion 950*b* of trace 910*j* can be electrically connected, in parallel, to traces 910*h-i* in sense connection 904*f* (which can electrically couple touch node electrode 902*f* to sense circuitry 908), as illustrated in FIG. 9, thus reducing the resistance per unit length of sense connection 904*f* along the length of portion 950*b* of trace 910*j* (and reducing the resistance of sense connection 904*f*, overall). Similarly, portions 950*c* of traces 910*h-j* that are not used for electrically connecting touch node electrode 902*f* to sense circuitry 908 can be electrically connected, in parallel, to traces 910*e-g* in sense connection 904*d* (which can electrically couple touch node electrode 902*d* to sense circuitry 908), as illustrated in FIG. 9, thus reducing the resistance of sense connection 904*d*. Finally, portions 950*d* of traces 910*e-j* that are not used for electrically connecting touch node electrode 902*d* to sense circuitry 908 can be electrically connected, in parallel, to traces 910*a-d* in sense connection 904*b* (which can electrically couple touch node electrode 902*b* to sense circuitry 908), as illustrated in FIG. 9, thus reducing the resistance of sense connection 904*b*. In this way, substantially the entirety of traces 910*a*-910*j* can be used on the touch screen to electrically connect touch node electrodes 902*b*, 902*d*, 902*f* and 902*h* to sense circuitry 908.

The Group B traces can be configured analogously to the Group A traces to electrically connect touch node electrodes 902*a*, 902*c*, 902*e* and 902*g* to sense circuitry 908, as illustrated in FIG. 9, the details of which will not be repeated here for brevity. Further, groups of traces corresponding to other touch node electrodes not illustrated in FIG. 9 (e.g., others of the 48 touch node electrodes in the column of touch node electrodes illustrated) can be analogously configured in the same pattern as is shown with respect to the Group A and B traces, as well.

Thus, the examples of the disclosure provide one or more sense connection configurations for tuning the resistive and/or capacitive loads presented to drive and/or sense circuitry in a touch screen.

Therefore, according to the above, some examples of the disclosure are directed to a touch sensor panel comprising: a first touch node electrode of a plurality of touch node electrodes, the first touch node electrode coupled to a first sense connection comprising a first set of traces, the first sense connection configured to have a first resistance per unit length that varies along a length of the first sense connection; and a second touch node electrode of the plurality of touch node electrodes, the second touch node electrode coupled to a second sense connection comprising a second set of traces, the second sense connection configured to have a second resistance per unit length that varies along a length of the second sense connection differently than the first resistance per unit length varies along the length of the first sense connection, wherein an effective resistance of the first sense connection and the second sense connection are equal. Additionally or alternatively to one or more of the examples disclosed above, in some examples, the first touch node electrode and the second touch node electrode are both in either a row or a column of touch node electrodes on the touch sensor panel. Additionally or alternatively to one or more of the examples disclosed above, in some examples, the first sense connection comprises a first number of traces, and the second sense connection comprises a second number of traces, equal to the first number of traces. Additionally or alternatively to one or more of the examples disclosed above, in some examples, the first sense connection comprises a first portion and a second portion configured to couple the first touch node electrode to sense circuitry, the first portion of the first sense connection comprising a first number of traces of the first set of traces coupled together, in parallel, and the second portion of the first sense connection comprising a second number of traces, different from the first number of traces, of the first set of traces coupled together, in parallel, and the second sense connection comprises a first portion and a second portion configured to couple the second touch node electrode to the sense circuitry, the first portion of the second sense connection comprising a first number of traces of the second set of traces coupled together, in parallel, and the second portion of the second sense connection comprising a second number of traces, different from the first number of traces, of the second set of traces coupled together, in parallel. Additionally or alternatively to one or more of the examples disclosed above, in some examples, a length of the first portion of the first sense connection and a length of the first portion of the second sense connection are different. Additionally or alternatively to one or more of the examples disclosed above, in some examples, a length of the second portion of the first sense connection and a length of the second portion of the second sense connection are different. Additionally or alternatively to one or more of the examples disclosed above, in some examples, a capacitance of the first sense connection is equal to a capacitance of the second sense connection. Additionally or alternatively to one or more of the examples disclosed above, in some examples, a first respective portion of a first trace of the first set of traces is coupled to the second sense connection. Additionally or alternatively to one or more of the examples disclosed above, in some examples, the first trace includes a first portion and a second portion, the second portion of the first trace comprising the first respective portion of the first trace, and the first portion of the first trace decoupled from the second portion of the first trace, the first portion of the first trace is configured to couple the first touch node electrode to sense circuitry, and the second portion of the first trace is configured to couple the second touch node electrode to the sense circuitry. Additionally or alternatively to one or more of the examples disclosed above, in some examples, the second portion of the first trace is coupled, in parallel, to at least a portion of the second set of traces in the second sense connection. Additionally or alternatively to one or more of the examples disclosed above, in some examples, the touch sensor panel further comprises: a third touch node electrode of the plurality of touch node electrodes, the third touch node electrode coupled to a third sense connection comprising a third set of traces, wherein a first respective portion of a second trace of the second set of traces, and a second respective portion of the first trace of the first set of traces are coupled to the third sense connection. Additionally or alternatively to one or more of the examples disclosed above, in some examples, the first trace further includes a third portion, the third portion of the first trace comprising the second respective portion of the first trace, and the third portion of the first trace decoupled from the first and second portions of the first trace, the second trace includes a first portion and a second portion, the second portion of the second trace comprising the first respective portion of the second trace, and the first portion of the second trace decoupled from the second portion of the second trace, the first portion of the second trace is configured to couple the second touch node electrode to the sense circuitry, and the second portion of the second trace and the third portion of the first trace are configured to couple the third touch node electrode to the sense circuitry. Additionally or alternatively to one or more of the examples disclosed above, in some examples, the second portion of the second trace and the third portion of the first trace are coupled, in parallel, to at least a portion of the third set of traces in the third sense connection. Additionally or alternatively to one or more of the examples disclosed above, in some examples, the touch sensor panel further comprises: a third touch node electrode and a fourth touch node electrode in a column of touch node electrodes on the touch sensor panel, the column of touch node electrodes including the first touch node electrode and the second touch node electrode, the third touch node electrode coupled to a third sense connection comprising a third set of traces, and the fourth touch node electrode coupled to a fourth sense connection comprising a fourth set of traces, wherein: the first touch node electrode is separated from the second touch node electrode by a first number of touch node electrodes, the third touch node electrode is separated from the fourth touch node electrode by the first number of touch node electrodes, a number of traces in the first set of traces equals a number of traces in the third set of traces, and a number of traces in the second set of traces equals a number of traces in the fourth set of traces. Additionally or alternatively to one or more of the examples disclosed above, in some examples, the first touch node electrode is adjacent the third touch node electrode on the touch sensor panel, and the second touch node electrode is adjacent the fourth touch node electrode on the touch sensor panel. Additionally or alternatively to one or more of the examples disclosed above, in some examples, the first sense connection and the second sense connection are disposed in a first region of the touch sensor panel, and the third sense connection and the fourth sense connection are disposed in a second region of the touch sensor panel, other than the first region, adjacent the first region.

Some examples of the disclosure are directed to a touch sensor panel comprising: a first touch node electrode of a plurality of touch node electrodes, the first touch node electrode coupled to a first sense connection comprising a first portion of a first trace and a second portion of the first trace, the first portion of the first trace configured to couple the first touch node electrode to sense circuitry, and the second portion of the first trace decoupled from the first portion of the first trace; and a second touch node electrode of the plurality of touch node electrodes, the second touch node electrode coupled to a second sense connection comprising a first portion of a second trace and a second portion of the second trace, the first portion of the second trace configured to couple the second touch node electrode to the sense circuitry, and the second portion of the second trace decoupled from the first portion of the second trace, wherein a length of the first portion of the first trace is different from a length of the first portion of the second trace. Additionally or alternatively to one or more of the examples disclosed above, in some examples, the first touch node electrode and the second touch node electrode are in a row or a column of touch node electrodes on the touch sensor panel. Additionally or alternatively to one or more of the examples disclosed above, in some examples, the second portion of the first trace and the second portion of the second trace are coupled to a voltage source, different from the sense circuitry. Additionally or alternatively to one or more of the examples disclosed above, in some examples, the voltage source is configured to apply a first voltage to the second portion of the first trace and the second portion of the second trace, and the sense circuitry is configured to apply a second voltage to the first portion of the first trace and the first portion of the second trace. Additionally or alternatively to one or more of the examples disclosed above, in some examples, the first voltage is the same as the second voltage.

Some examples of the disclosure are directed to a method of fabricating a touch sensor panel, the method comprising: forming a first touch node electrode of a plurality of touch node electrodes, the first touch node electrode coupled to a first sense connection comprising a first set of traces, the first sense connection configured to have a first resistance per unit length that varies along a length of the first sense connection; and forming a second touch node electrode of the plurality of touch node electrodes, the second touch node electrode coupled to a second sense connection comprising a second set of traces, the second sense connection configured to have a second resistance per unit length that varies along a length of the second sense connection differently than the first resistance per unit length varies along the length of the first sense connection, wherein an effective resistance of the first sense connection and the second sense connection are equal.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensor panel comprising:
 a first touch node electrode of a plurality of touch node electrodes, the first touch node electrode coupled to a first sense connection comprising a first set of traces, the first sense connection configured to have a first resistance per unit length that varies along a length of the first sense connection; and
 a second touch node electrode of the plurality of touch node electrodes, the second touch node electrode coupled to a second sense connection comprising a second set of traces, the second sense connection configured to have a second resistance per unit length that varies along a length of the second sense connection differently than the first resistance per unit length varies along the length of the first sense connection,
 wherein a resistance of the first sense connection and the second sense connection are equal.

2. The touch sensor panel of claim 1, wherein the first touch node electrode and the second touch node electrode are both in either a row or a column of touch node electrodes on the touch sensor panel.

3. The touch sensor panel of claim 1, wherein the first sense connection comprises a first number of traces, and the second sense connection comprises a second number of traces, equal to the first number of traces.

4. The touch sensor panel of claim 1, wherein:
 the first sense connection comprises a first portion and a second portion configured to couple the first touch node electrode to sense circuitry, the first portion of the first sense connection comprising a first number of traces of the first set of traces coupled together, in parallel, and the second portion of the first sense connection comprising a second number of traces, different from the first number of traces, of the first set of traces coupled together, in parallel, and the second sense connection comprises a first portion and a second portion configured to couple the second touch node electrode to the sense circuitry, the first portion of the second sense connection comprising a first number of traces of the second set of traces coupled together, in parallel, and the second portion of the second sense connection comprising a second number of traces, different from the first number of traces, of the second set of traces coupled together, in parallel.

5. The touch sensor panel of claim 4, wherein a length of the first portion of the first sense connection and a length of the first portion of the second sense connection are different.

6. The touch sensor panel of claim 4, wherein a length of the second portion of the first sense connection and a length of the second portion of the second sense connection are different.

7. The touch sensor panel of claim 1, wherein a capacitance of the first sense connection is equal to a capacitance of the second sense connection.

8. The touch sensor panel of claim 1, wherein a first respective portion of a first trace of the first set of traces is coupled to the second sense connection.

9. The touch sensor panel of claim 8, wherein:
the first trace includes a first portion and a second portion, the second portion of the first trace comprising the first respective portion of the first trace, and the first portion of the first trace decoupled from the second portion of the first trace,
the first portion of the first trace is configured to couple the first touch node electrode to sense circuitry, and
the second portion of the first trace is configured to couple the second touch node electrode to the sense circuitry.

10. The touch sensor panel of claim 9, wherein the second portion of the first trace is coupled, in parallel, to at least a portion of the second set of traces in the second sense connection.

11. The touch sensor panel of claim 9, further comprising:
a third touch node electrode of the plurality of touch node electrodes, the third touch node electrode coupled to a third sense connection comprising a third set of traces,
wherein a first respective portion of a second trace of the second set of traces, and a second respective portion of the first trace of the first set of traces are coupled to the third sense connection.

12. The touch sensor panel of claim 11, wherein:
the first trace further includes a third portion, the third portion of the first trace comprising the second respective portion of the first trace, and the third portion of the first trace decoupled from the first and second portions of the first trace,
the second trace includes a first portion and a second portion, the second portion of the second trace comprising the first respective portion of the second trace, and the first portion of the second trace decoupled from the second portion of the second trace, the first portion of the second trace is configured to couple the second touch node electrode to the sense circuitry, and the second portion of the second trace and the third portion of the first trace are configured to couple the third touch node electrode to the sense circuitry.

13. The touch sensor panel of claim 12, wherein the second portion of the second trace and the third portion of the first trace are coupled, in parallel, to at least a portion of the third set of traces in the third sense connection.

14. The touch sensor panel of claim 1, further comprising:
a third touch node electrode and a fourth touch node electrode in a column of touch node electrodes on the touch sensor panel, the column of touch node electrodes including the first touch node electrode and the second touch node electrode, the third touch node electrode coupled to a third sense connection comprising a third set of traces, and the fourth touch node electrode coupled to a fourth sense connection comprising a fourth set of traces,
wherein:
the first touch node electrode is separated from the second touch node electrode by a first number of touch node electrodes,
the third touch node electrode is separated from the fourth touch node electrode by the first number of touch node electrodes,
a number of traces in the first set of traces equals a number of traces in the third set of traces, and
a number of traces in the second set of traces equals a number of traces in the fourth set of traces.

15. The touch sensor panel of claim 14, wherein the first touch node electrode is adjacent the third touch node electrode on the touch sensor panel, and the second touch node electrode is adjacent the fourth touch node electrode on the touch sensor panel.

16. The touch sensor panel of claim 14, wherein the first sense connection and the second sense connection are disposed in a first region of the touch sensor panel, and the third sense connection and the fourth sense connection are disposed in a second region of the touch sensor panel, other than the first region, adjacent the first region.

17. A method of fabricating a touch sensor panel, the method comprising:
forming a first touch node electrode of a plurality of touch node electrodes, the first touch node electrode coupled to a first sense connection comprising a first set of traces, the first sense connection configured to have a first resistance per unit length that varies along a length of the first sense connection; and
forming a second touch node electrode of the plurality of touch node electrodes, the second touch node electrode coupled to a second sense connection comprising a second set of traces, the second sense connection configured to have a second resistance per unit length that varies along a length of the second sense connection differently than the first resistance per unit length varies along the length of the first sense connection,
wherein a resistance of the first sense connection and the second sense connection are equal.

\* \* \* \* \*